US011233623B2

(12) United States Patent
Xu et al.

(10) Patent No.: US 11,233,623 B2
(45) Date of Patent: Jan. 25, 2022

(54) SYSTEM AND METHOD FOR MEASURING AND CONTROLLING CROSS-LINK INTERFERENCE IN WIRELESS COMMUNICATIONS

(71) Applicant: ZTE CORPORATION, Guangdong (CN)

(72) Inventors: Hanging Xu, Guangdong (CN); Yajun Zhao, Guangdong (CN); Xincai Li, Guangdong (CN); Ling Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 153 days.

(21) Appl. No.: 16/705,066

(22) Filed: Dec. 5, 2019

(65) Prior Publication Data
US 2020/0112420 A1 Apr. 9, 2020

Related U.S. Application Data

(63) Continuation of application No. PCT/CN2017/087765, filed on Jun. 9, 2017.

(51) Int. Cl.
*H04L 5/00* (2006.01)
*H04B 17/318* (2015.01)
(Continued)

(52) U.S. Cl.
CPC ......... *H04L 5/0073* (2013.01); *H04B 17/318* (2015.01); *H04B 17/336* (2015.01);
(Continued)

(58) Field of Classification Search
CPC .. H04B 17/309; H04B 17/318; H04B 17/336; H04B 17/345; H04B 17/373;
(Continued)

(56) References Cited

U.S. PATENT DOCUMENTS 9,775,056 B2 * 9/2017 Pan .................. H04W 16/10
10,368,357 B2 * 7/2019 Lopez-Perez ....... H04W 72/042
(Continued)

FOREIGN PATENT DOCUMENTS

BR  112015025356 A2 * 7/2017 .......... H04W 52/244
CN  103068050 A   4/2013
(Continued)

OTHER PUBLICATIONS

ZTE, ZTE Microelectronics, "Discussion on Measurements and RS Design for CLI Mitigation," 3GPP TSG RAN WG1 Meeting#88bis, R1-1704434, Spokane, Washington, Apr. 3-7, 2017, 11 pages.
(Continued)

*Primary Examiner* — Eric Nowlin
(74) *Attorney, Agent, or Firm* — Duane Morris LLP

(57) ABSTRACT

A method and system for measuring and controlling cross-link interference (CLI) between two devices in a wireless communication network is disclosed herein. In one embodiment, a method implemented on a first node for mitigating CLI between the first node and a second node is disclosed. The method comprises: receiving a wireless signal from the second node; measuring the wireless signal to determine a measurement value according to a predetermined metric for measuring CLI; determining an event based on the measurement value; and mitigating the CLI in accordance with a predetermined mitigation scheme associated with the event.

16 Claims, 11 Drawing Sheets

(51) Int. Cl.

| | | |
|---|---|---|
| *H04B 17/336* | (2015.01) | |
| *H04W 76/27* | (2018.01) | |
| *H04W 24/10* | (2009.01) | |
| *H04W 72/04* | (2009.01) | |
| *H04W 80/02* | (2009.01) | |

(52) U.S. Cl.
CPC ......... *H04W 24/10* (2013.01); *H04W 72/042* (2013.01); *H04W 72/0446* (2013.01); *H04W 76/27* (2018.02); *H04W 80/02* (2013.01)

(58) Field of Classification Search
CPC .... H04L 5/0073; H04W 24/02; H04W 24/10; H04W 72/042; H04W 72/0446; H04W 72/082; H04W 72/085; H04W 76/27; H04W 80/02
See application file for complete search history.

(56) References Cited

U.S. PATENT DOCUMENTS

| | | | | |
|---|---|---|---|---|
| 10,477,420 | B2 * | 11/2019 | Ghosh | H04W 24/08 |
| 10,644,845 | B2 * | 5/2020 | Yang | H04L 1/0026 |
| 10,715,208 | B2 * | 7/2020 | Tokgoz | H04W 16/14 |
| 10,903,920 | B2 * | 1/2021 | Azarian Yazdi | H04L 5/0048 |
| 10,924,959 | B2 * | 2/2021 | Zhu | H04W 76/28 |
| 2015/0333877 | A1 * | 11/2015 | Rahman | H04L 1/1812 370/280 |
| 2016/0020893 | A1 | 1/2016 | Tong et al. | |
| 2017/0034790 | A1 * | 2/2017 | Lopez-Perez | H04W 72/1278 |
| 2017/0034817 | A1 * | 2/2017 | Lopez-Perez | H04W 72/0413 |
| 2018/0205427 | A1 * | 7/2018 | Ghosh | H04B 17/318 |
| 2018/0220319 | A1 * | 8/2018 | Kim | H04W 24/10 |
| 2018/0323887 | A1 * | 11/2018 | Azarian Yazdi | H04L 5/0073 |
| 2018/0323916 | A1 * | 11/2018 | Yang | H04L 5/0053 |
| 2019/0132023 | A1 * | 5/2019 | Tokgoz | H04W 16/14 |
| 2019/0230536 | A1 * | 7/2019 | Da Silva | H04W 36/0058 |
| 2019/0261379 | A1 * | 8/2019 | Yerramalli | H04B 1/1027 |
| 2019/0274053 | A1 * | 9/2019 | Wang | H04W 72/0446 |
| 2019/0313418 | A1 * | 10/2019 | Wang | H04L 5/0035 |
| 2019/0320372 | A1 * | 10/2019 | Zhang | H04W 24/10 |
| 2019/0327629 | A1 * | 10/2019 | Zhang | H04B 7/0626 |
| 2019/0357224 | A1 * | 11/2019 | Li | H04W 72/04 |
| 2020/0112420 | A1 * | 4/2020 | Xu | H04W 24/10 |
| 2020/0169341 | A1 * | 5/2020 | Hwang | H04B 17/345 |
| 2020/0169435 | A1 * | 5/2020 | Kang | H04L 27/2607 |
| 2020/0228213 | A1 * | 7/2020 | Masai | H04W 72/082 |
| 2020/0266908 | A1 * | 8/2020 | Qian | H04L 27/2613 |
| 2020/0351690 | A1 * | 11/2020 | Zhu | H04B 17/336 |
| 2020/0389805 | A1 * | 12/2020 | Kim | H04W 72/042 |
| 2021/0006997 | A1 * | 1/2021 | Jin | H04B 17/345 |
| 2021/0112503 | A1 * | 4/2021 | Zhang | H04W 24/10 |
| 2021/0144574 | A1 * | 5/2021 | Jin | H04L 5/1438 |
| 2021/0144577 | A1 * | 5/2021 | Zhu | H04L 5/0051 |
| 2021/0153052 | A1 * | 5/2021 | Taherzadeh Boroujeni | H04W 72/082 |
| 2021/0153053 | A1 * | 5/2021 | Taherzadeh Boroujeni | H04W 80/02 |
| 2021/0307008 | A1 * | 9/2021 | Raghavan | H04W 72/082 |

FOREIGN PATENT DOCUMENTS

| | | | | |
|---|---|---|---|---|
| CN | 105164948 | A * | 12/2015 | H04B 17/345 |
| CN | 105164948 | B * | 3/2018 | H04W 52/244 |
| CN | 109219970 | A * | 1/2019 | H04L 5/0053 |
| EP | 2982062 | A1 * | 2/2016 | H04B 17/345 |
| EP | 2982062 | B1 * | 12/2019 | H04J 11/0053 |
| EP | 3635993 | A1 * | 4/2020 | H04J 11/005 |
| EP | 3635993 | A4 * | 7/2020 | H04L 1/0026 |
| ES | 2774687 | T3 * | 7/2020 | H04W 52/244 |
| JP | 6176641 | B2 * | 8/2017 | H04B 17/345 |
| MX | 2015013974 | A * | 2/2016 | H04J 11/0053 |
| MX | 350671 | B * | 9/2017 | H04W 52/244 |
| RU | 2609135-01 | * | 1/2017 | H04W 72/082 |
| WO | WO-2014161592 | A1 * | 10/2014 | H04W 72/082 |
| WO | WO-2018202144 | A1 * | 11/2018 | H04J 11/005 |
| WO | WO-2020143016 | A1 * | 7/2020 | H04W 24/00 |
| WO | WO-2020143027 | A1 * | 7/2020 | H04W 24/00 |
| WO | WO-2020143706 | A1 * | 7/2020 | H04W 24/00 |
| WO | WO-2020143736 | A1 * | 7/2020 | H04W 24/00 |
| WO | WO-2020170218 | A1 * | 8/2020 | H04W 24/10 |

OTHER PUBLICATIONS

ZTE, ZTE Microelectronics, "Discussion on Measurements and RS Design for CLI Mitigation," 3GPP TSG RAN WG1 Meeting#88, R1-1701615, Athens, Greece, Feb. 13-17, 2017, 13 pages.

Huawei et al: "UE-to-UE measurement for cross-link interference mitigation", vol. RAN WG1, No. Hangzhou, China; May 15, 2017-May 19, 2017, May 14, 2017 (May 14, 2017), XP051272141, Retrieved from the Internet <URL:http://www.3gpp.org/ftp/Meetings_3GPP_SYNC/RAN1/Docs/> [retrieved on May 14, 2017].

* cited by examiner

SYSTEM AND METHOD FOR MEASURING AND CONTROLLING CROSS-LINK INTERFERENCE IN WIRELESS COMMUNICATIONS

CROSS-REFERENCE TO RELATED APPLICATION

The present application claims priority to PCT international application PCT/CN2017/087765, filed on Jun. 9, 2017, which is expressly incorporated by reference herein in its entirety.

TECHNICAL FIELD

The disclosure relates generally to wireless communications and, more particularly, to systems and methods for measuring and controlling cross-link interference between two devices in a wireless communication network.

BACKGROUND

Over the past few decades, mobile communications have evolved from voice services to high-speed broadband data services. With further development of new types of businesses and applications, e.g. the mobile Internet and Internet of Things (IoT), the demands on data on mobile networks will continue to increase exponentially. On one hand, data traffic in mobile networks is expected to have an explosive growth in the future. On the other hand, massive equipment connections and diversified services and applications will be key features of future wireless communication systems. People-centered communications and machine-centered communications will coexist and continue to grow. Based on diversified business and application requirements in future mobile communications, wireless communication systems should meet a variety of requirements, such as throughput, latency, reliability, link density, cost, energy consumption, complexity, and coverage.

An LTE (Long-Term Evolution) system can support performing FDD (Frequency Division Duplex) operation on a pair of spectrums (e.g. performing downlink on one carrier and uplink on another carrier). It also supports TDD (Time Division Duplex) operation on an unpaired carrier. In a conventional TDD operation mode, only a limited number of configurations of uplink and downlink sub-frame allocations (corresponding to configuration 0 to configuration 6) are utilized. Adjacent areas use a same configuration, that is, with the same direction of transmission. The technology of eIMTA (enhanced interference mitigation and traffic adaptation) can configure semi-statically (at 10 ms or more) the uplink and downlink of the LTE system, and make adjacent areas use different configurations of TDD uplink and downlink sub-frame allocations. But these configurations are still limited to the several configurations described above.

Future wireless communication systems (such as the 5G/New Radio system) should support dynamic TDD operations, flexible Duplexing (or Duplexing flexibility) operations, and full Duplexing operations, in order to meet the fast adaptive requirements of the business and to further improve the efficiency of spectrum utilization. Taking dynamic TDD as an example, a dynamic TDD operation refers to dynamically or semi-dynamically changing the transmission direction as uplink or downlink, on the unpaired spectrum (or on the uplink or downlink carriers in the paired spectrum). Compared to eIMTA, dynamic TDD operations can support direction changes in a sub-frame level, a time slot level, or in an even more dynamic level. Moreover, the dynamic TDD is not limited to the several above mentioned configurations of uplink and downlink sub-frame allocations, and can schedule uplink and downlink transmissions in a more flexible manner. In some other documents, the dynamic TDD described above is equivalent to a flexible duplex or duplex flexibility mechanism; or a flexible duplex or duplex flexibility mechanism can include the dynamic TDD operation.

Each operation, whether it is dynamic TDD, flexible duplex/duplex flexibility, or full duplex, has to face a serious cross-link interference (CLI) problem. As used herein, the term "cross-link interference" or "CLI" refers to a signal interference from a wireless transmission of a first node to a wireless reception of a second node, where the wireless transmission and the wireless reception are in two separate wireless communication links with opposite link directions respectively (i.e., one is uplink and the other is downlink).

In the LTE standardization process, many works have been done to avoid same-link interference (SLI), such as ICIC (Inter-cell interference cancellation), CoMP (Coordinated multiple point) and so on, where the same-link interference is between two nodes that are in two separate wireless communications with a same link direction (e.g. both are uplink or both are downlink) Compared to the SLI, CLI is more serious, has greater impact, and has rapid changes in direction. To mitigate the CLI, one needs to first measure the CLI. There is no satisfactory solution for the problem of cross-link interference measurement and cross-link interference mitigation in existing literatures or existing technologies.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method implemented on a first node for mitigating cross-link interference (CLI) between the first node and a second node is disclosed. The method comprises: receiving a wireless signal from the second node; measuring the wireless signal to determine a measurement value according to a predetermined metric for measuring CLI; determining an event based on the measurement value; and mitigating the CLI in accordance with a predetermined mitigation scheme associated with the event.

In a further embodiment, a method implemented on a first node for mitigating CLI is disclosed. The method comprises: transmitting a wireless signal to a second node, wherein the second node measures the wireless signal to determine a measurement value according to a predetermined metric for measuring CLI; obtaining an event determined based on the measurement value; and mitigating the CLI in accordance with a predetermined mitigation scheme associated with the event.

In another embodiment, a first node configured to mitigate CLI between the first node and a second node is disclosed. The first node comprises: a receiver configured to receive a wireless signal from the second node; a CLI measurement unit configured to measure the wireless signal to determine a measurement value according to a predetermined metric for measuring CLI; an event detector configured to determine an event based on the measurement value; and a CLI controller configured to mitigate the CLI in accordance with a predetermined mitigation scheme associated with the event.

In yet another embodiment, a first node is disclosed. The first node comprises: a transmitter configured to transmit a wireless signal to a second node, wherein the second node measures the wireless signal to determine a measurement value according to a predetermined metric for measuring CLI; an event detector configured to obtain an event determined based on the measurement value; and a CLI controller configured to mitigate the CLI in accordance with a predetermined mitigation scheme associated with the event.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A cross-link interference (CLI) is an interference from a wireless transmission of a first node to a wireless reception of a second node, where the wireless transmission and the wireless reception are in two separate wireless communication links with opposite link directions respectively. For example, an uplink transmission of a first user equipment (UE) node may cause a CLI to a downlink reception of a second UE node; and a downlink transmission of a first base station (BS) node may cause a CLI to a downlink reception of a second BS node.

In order to solve the technical problems about CLI, the present teaching provides methods and devices for cross-link measurement including a measurement method between a UE and a UE, and a measurement method between TRP and TRP. By performing measurements according a series of metrics and determining one or more measurement events, one can effectively obtain the interference status between the UE and the UE, and the interference status between TRP and TRP, which can help to prevent or eliminate the cross-link interference afterwards, thus improving the performance of the wireless communication system.

Figure 1A:
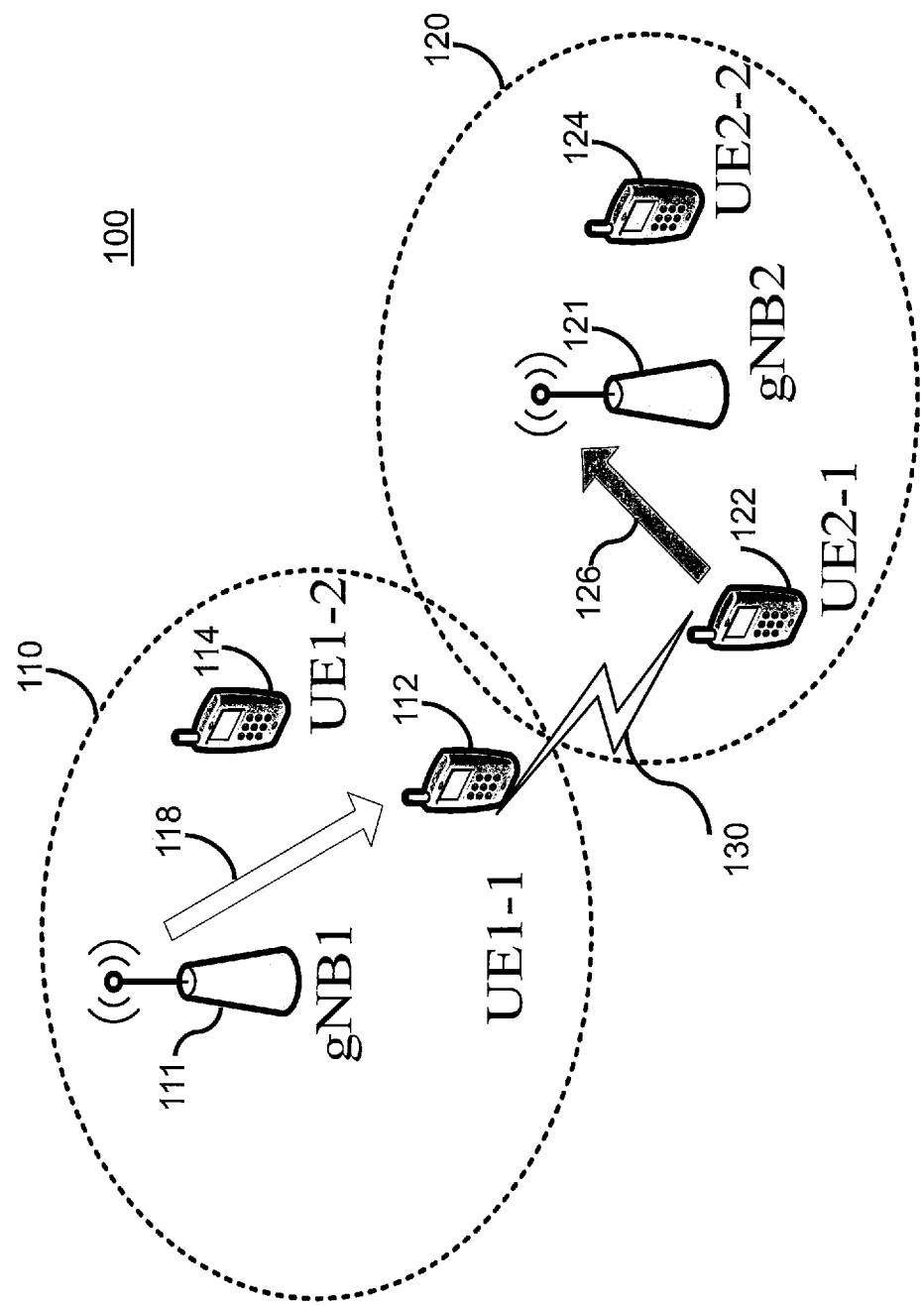
FIG. 1A illustrates an exemplary cross-link interference (CLI) between two user equipment (UE) devices in an exemplary cellular communication network in which techniques disclosed herein may be implemented, in accordance with an embodiment of the present disclosure.

FIG. 1A illustrates an exemplary CLI between two UEs in an exemplary cellular communication network 100 in which techniques disclosed herein may be implemented, in accordance with an embodiment of the present disclosure. As shown in FIG. 1A, the exemplary cellular communication network 100 includes two cells, 110 and 120, that are neighbors to each other. Each cell may include at least one base station operating at its allocated bandwidth to provide adequate radio coverage to its intended users. In various embodiments, a base station in the present disclosure can include, or be implemented as, a next Generation Node B (gNB), a Transmission/Reception Point (TRP), an Access Point (AP), etc. For example, the base station gNB1 111 in the first cell 110 may operate at an allocated channel transmission bandwidth to provide adequate coverage to the UE1-1 112 and UE1-2 114.

A BS and a UE device can communicate with each other via a communication link, e.g., a wireless communication channel. For example, the gNB1 111 in the first cell 110 can communicate with the UE1-1 112 via a downlink radio frame 118; and the UE2-1 122 in the second cell 120 can communicate with the gNB2 121 via an uplink radio frame 126. Each radio frame may be further divided into subframes which may include data symbols. According to some embodiments of the present disclosure, a base station (BS) and a user equipment (UE) may be described herein as non-limiting examples of "communication nodes," or "nodes" generally, which can practice the methods disclosed herein. Such communication nodes may be capable of wireless and/or wired communications, in accordance with various embodiments of the present disclosure.

As shown in FIG. 1A, because the UE2-1 122 is located near the boundary of the second cell 120, the UE2-1 122 will use a high transmit power for the uplink transmission 126 from the UE2-1 122 to the gNB2 121. At the same time, because the UE1-1 112 is located near the boundary of the first cell 110, the UE1-1 112 will have a low receive power for the downlink reception 118 at the UE1-1 112. As such, the uplink transmission of UE2-1 122 will cause a (UE-to-UE) cross-link interference 130 to the downlink reception of UE1-1 112, especially when the UE2-1 122 and UE1-1 112 are located close to each other as shown in FIG. 1A. It can be understood that, when the two UEs are not close or when the two UEs are not near the boundary of their respective cells, the UE-to-UE cross-link interference will still exist, although in a less severe manner.

Figure 1B:
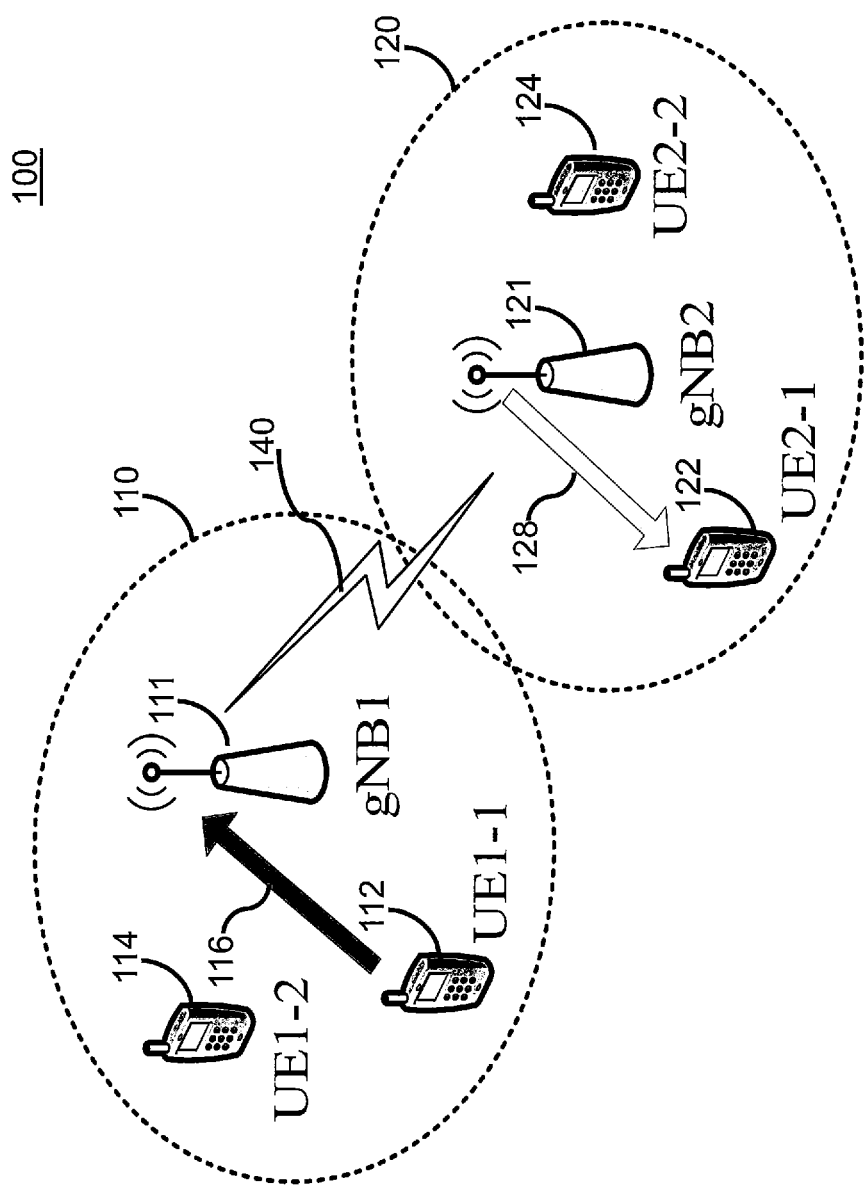
FIG. 1B illustrates an exemplary CLI between two base stations (BSs) in an exemplary cellular communication network in which techniques disclosed herein may be implemented, in accordance with an embodiment of the present disclosure.

FIG. 1B illustrates an exemplary CLI between two base stations (BSs) in the exemplary cellular communication network 100 in which techniques disclosed herein may be implemented, in accordance with an embodiment of the present disclosure. As shown in FIG. 1B, the UE1-1 112 in the first cell 110 can communicate with the gNB1 111 via an uplink radio frame 116; and the gNB2 121 in the second cell 120 can communicate with the UE2-1 122 via a downlink radio frame 128. The gNB2 121 is a base station that uses a high transmit power to reach the UE2-1 122 which is located near the boundary of the second cell 120. At the same time, because the UE1-1 112 is located near the boundary of the first cell 110, when the gNB1 111 will have a low receive power for the uplink reception 116 at the gNB1 111. As such, the downlink transmission of gNB2 121 will cause a (gNB-to-gNB or BS-to-BS) cross-link interference 140 to the uplink reception of gNB1 111, especially when the gNB1 111 and the gNB2 121 are located close to each other in neighbor cells as shown in FIG. 1B. It can be understood that, when the two BSs are not close or when the two UEs are not near the boundary of their respective cells, the BS-to-BS cross-link interference will still exist, although in a less severe manner.

It can also be understood that, in FIG. 1A, the downlink transmission of gNB1 111 may cause a (gNB-to-gNB or BS-to-BS) cross-link interference to the uplink reception of gNB2 121. It can also be understood that, in FIG. 1B, the uplink transmission of UE1-1 112 may cause a (UE-to-UE) cross-link interference to the downlink reception of UE2-1 122, especially when the UE2-1 122 and UE1-1 112 are located close enough to each other. The CLI on the network side may include gNB-to-gNB CLI, TRP-to-TRP CLI, AP-to-AP CLI, etc.

Figure 2:
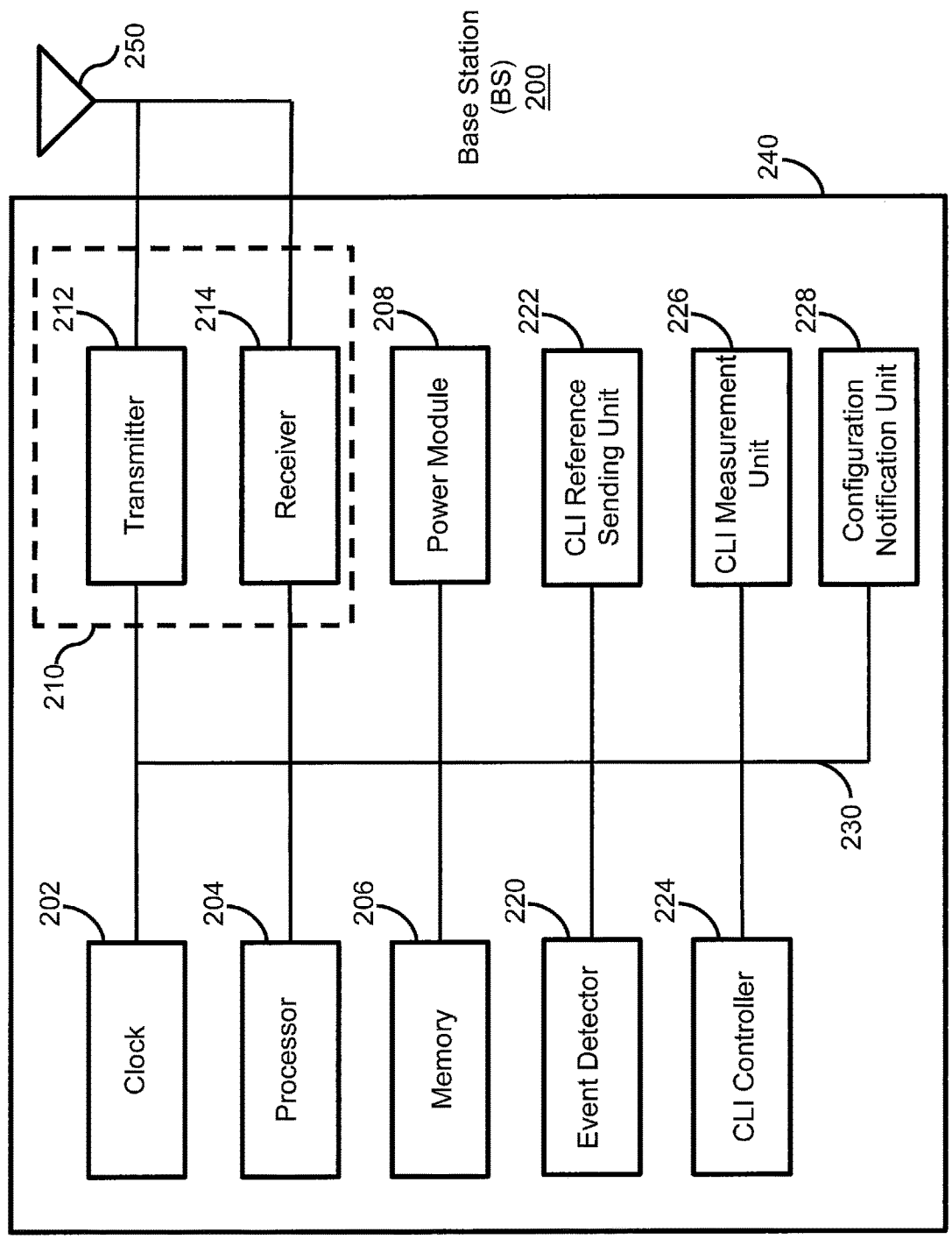
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, an event detector 220, a CLI reference sending unit 222, a CLI controller 224, a CLI measurement unit 226, and a configuration notification unit 228.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data. As described in further detail below, the processor 204 may determine a metric for measuring CLIs between BSs or between UEs, in accordance with various embodiments of the present disclosure.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, multiple transceivers, and/or multiple antennas. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

The CLI reference sending unit 222 may send, via the transmitter 212, a wireless signal as a CLI measurement signal to another BS (e.g. a neighbor BS) for measuring CLI from the BS 200 to the neighbor BS. While a conventional reference signal is usually sent by a BS to a UE in the same cell as the BS for switching cells, the CLI measurement signal disclosed herein is sent by one BS to another BS for measuring CLI. For example, as shown in FIG. 1B, the gNB2 121 may send a CLI measurement signal to the gNB1 111 for measuring CLI from the gNB2 121 to the gNB1 111. In one embodiment, the CLI reference sending unit 222 may determine a transmit power and resources for transmitting the CLI measurement signal, based on a transmission configuration from the configuration notification unit 228.

Figure 3:
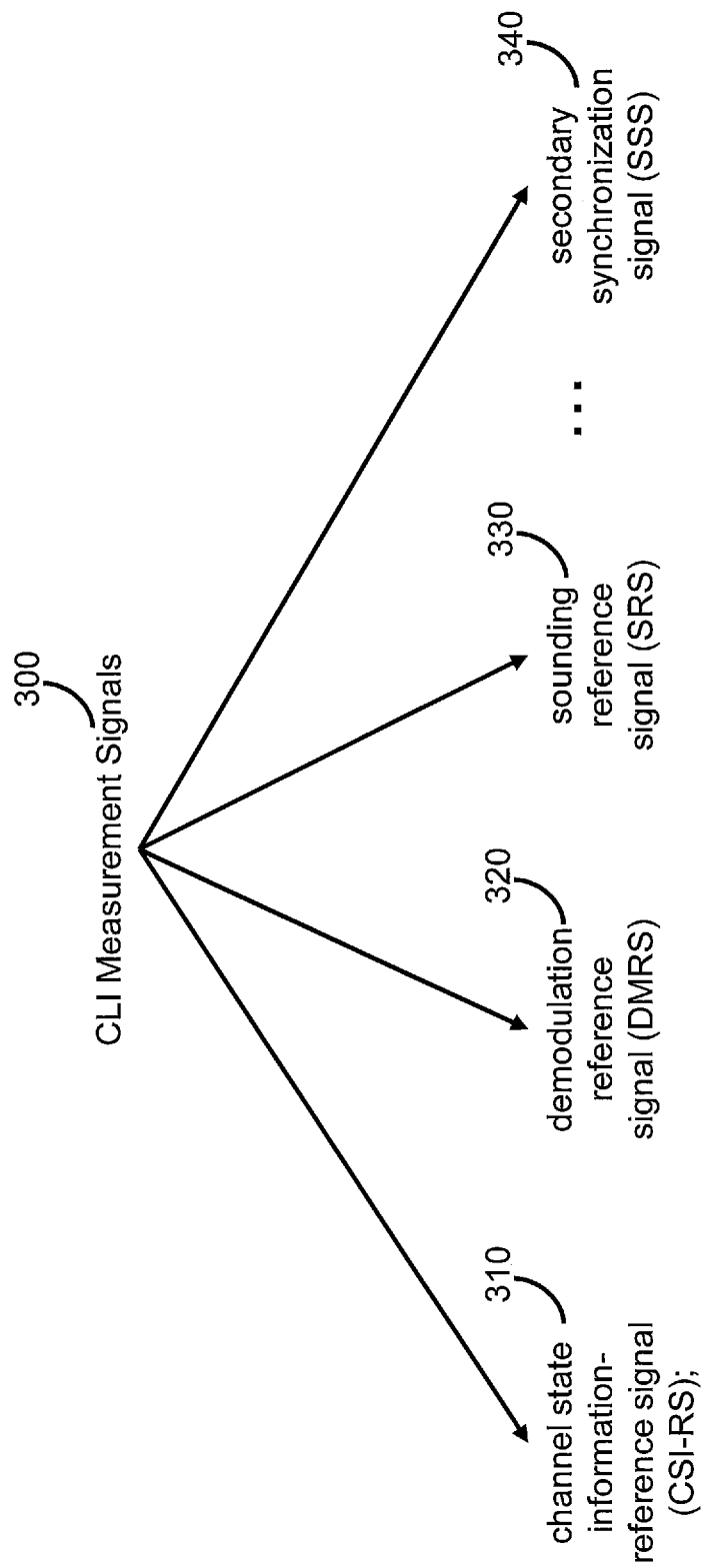
FIG. 3 illustrates exemplary CLI measurement signals that can be used for measuring the CLI, in accordance with some embodiments of the present disclosure.

FIG. 3 illustrates exemplary CLI measurement signals that can be used for measuring the CLI, in accordance with some embodiments of the present disclosure. As shown in FIG. 3, the exemplary CLI measurement signals 300 include channel state information-reference signal (CSI-RS) 310, demodulation reference signal (DMRS) 320, sounding reference signal (SRS) 330, and secondary synchronization signal (SSS) 340, etc. Details about these signals will be described later in accordance with different embodiments.

Referring back to FIG. 2, the CLI measurement unit 226 may measure a CLI measurement signal, e.g. sent by a neighbor BS, to determine a measurement value according to a predetermined metric for measuring CLI from the neighbor BS to the BS 200. While a conventional BS does not receive a downlink signal from another BS in a neighbor cell, the BS 200 disclosed herein can receive the CLI measurement signal as a downlink signal from a neighbor BS and then measure the measurement signal by the CLI measurement unit 226 according to a predetermined metric. For example, as shown in FIG. 1B, the gNB1 111 may receive and measure a CLI measurement signal, which is a downlink signal sent by the gNB2 121, to determine CLI from the gNB2 121 to the gNB1 111. In one embodiment, the receiver 214 may receive a notification of a measurement resource for measuring the CLI measurement signal from the neighbor BS, e.g. based on backhaul signaling or over the air (OTA) signaling.

The CLI measurement unit 226 may then measure the signal on the measurement resource. In another embodiment, the receiver 214 may receive configuration information from the neighbor BS. The configuration information may comprise: (a) a transmission configuration specifying resources for transmitting the measurement signal from the neighbor BS to the BS 200, (b) a measurement configuration about resources for measuring the measurement signal, or (c) both the transmission configuration and the measurement configuration. For example, the neighbor BS may transmit a downlink signal as the measurement signal in a first set of sub-frames including sub-frames 5, 10, 15, 20, 25 . . . , while the CLI measurement unit 226 only measures the measurement signal in a second set of sub-frames including sub-frames 10, 20, . . . that is a subset of the first set of sub-frames.

Figure 4:
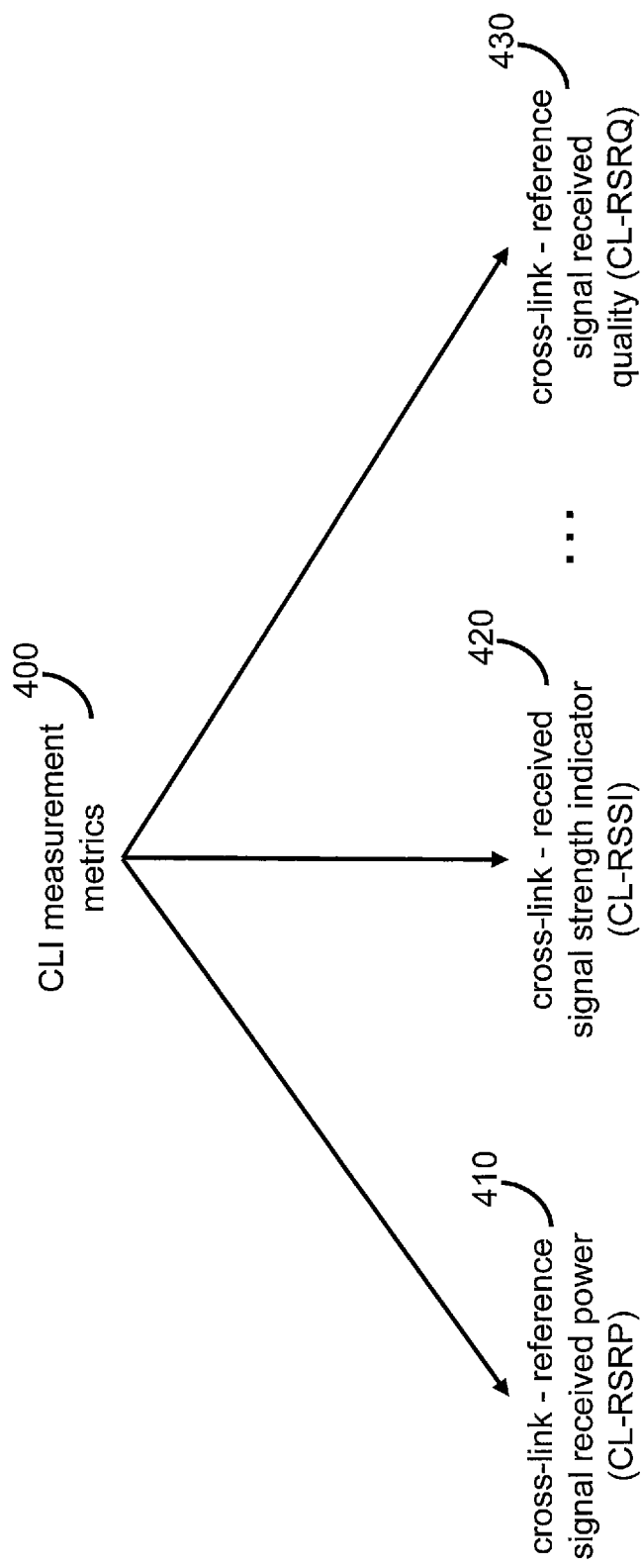
FIG. 4 illustrates exemplary CLI measurement metrics for measuring the CLI, in accordance with some embodiments of the present disclosure.

FIG. 4 illustrates exemplary CLI measurement metrics 400 for measuring the CLI, in accordance with some embodiments of the present disclosure. As shown in FIG. 4, the exemplary CLI measurement metrics 400 include cross-link-reference signal received power (CL-RSRP) 410, cross-link-received signal strength indicator (CL-RSSI) 420, cross-link-reference signal received quality (CL-RSRQ) 430, etc. Details about these metrics will be described later in accordance with different embodiments.

Referring back to FIG. 2, the configuration notification unit 228 may send, to a neighbor BS, a notification of the measurement resource for measuring the wireless signal based on at least one of: backhaul signaling and over the air (OTA) signaling. The configuration notification unit 228 may also send the configuration information to the neighbor BS, for measuring BS-to-BS CLI. For example, the configuration notification unit 228 may be in the gNB2 121 in FIG. 1B, for sending the measurement resource and configuration information to the gNB1 111. In one embodiment, for measuring UE-to-UE CLI, the configuration notification unit 228 in the BS 200 may send a notification of a measurement resource for measuring the CLI reference signal based on at least one of: Radio Resource Control (RRC) signaling, Media Access Control (MAC) Control Element (CE), and Downlink Control Information (DCI) signaling. For example, the configuration notification unit 228 may be in the gNB1 111 in FIG. 1A, for sending a notification of the measurement resource to the UE1-1 112.

In one embodiment, the processor 204 may determine which metric is to be used for measuring the CLI. According to the determined metric, the CLI measurement unit 226 can measure the measurement signal to determine a measurement value, and send the measurement value to the event detector 220 for determining an event based on the measurement value.

The event detector 220 may receive the measurement value from the CLI measurement unit 226, compare the measurement value with a determined threshold value to generate a comparison result, and determine an event based on the comparison result. According to various embodiments, the determined threshold value may be determined based on: (a) an absolute threshold, (b) a reference measurement value of a first reference signal in an uplink communication received by the BS 200, and an offset related to powers of the measurement signal and the first reference signal, or (c) a reference measurement value of a second reference signal transmitted from the neighbor BS to the BS 200 when the two BS nodes perform wireless communications in a same link direction (both uplink or both downlink), and an offset related to powers of the measurement signal and the second reference signal. The event detector 220 determines which event happens, e.g. the measurement value of the measurement signal is greater than or less than a threshold value, and inform the CLI controller 224 about the event. In one embodiment, for an event detector in the gNB1 111 in FIG. 1B, the event detector can determine whether the CLI 140 is greater than a determined threshold value or not, and inform a CLI controller in the gNB1 111 for controlling the CLI 140. In another embodiment, for an event detector in the gNB2 121 in FIG. 1B, the event detector can obtain an event about whether the CLI 140 is greater than a determined threshold value or not, and inform a CLI controller in the gNB2 121 for controlling the CLI 140. This may happen when a CLI mitigation scheme asks the gNB2 121 to adjust its transmit power or other transmit parameters.

The CLI controller 224 may receive the event information from the event detector 220, and mitigate the CLI in accordance with a predetermined mitigation scheme associated with the event. In one embodiment, the CLI controller 224 may dynamically control the CLI by: executing a CLI suppression mechanism when the event indicates that the measurement value is greater than or equal to the determined threshold value, and ending the CLI suppression mechanism when the measurement value is smaller than the determined threshold value. The determined threshold value may be dynamically adjusted based on a frequency of execution of the CLI suppression mechanism, or based on quality of service (QoS) requirement of the wireless communication in the network. In accordance with various embodiments, the CLI controller 224 may be in either the gNB1 111 or the gNB2 121 in FIG. 1B, for controlling the CLI 140.

Figure 5:
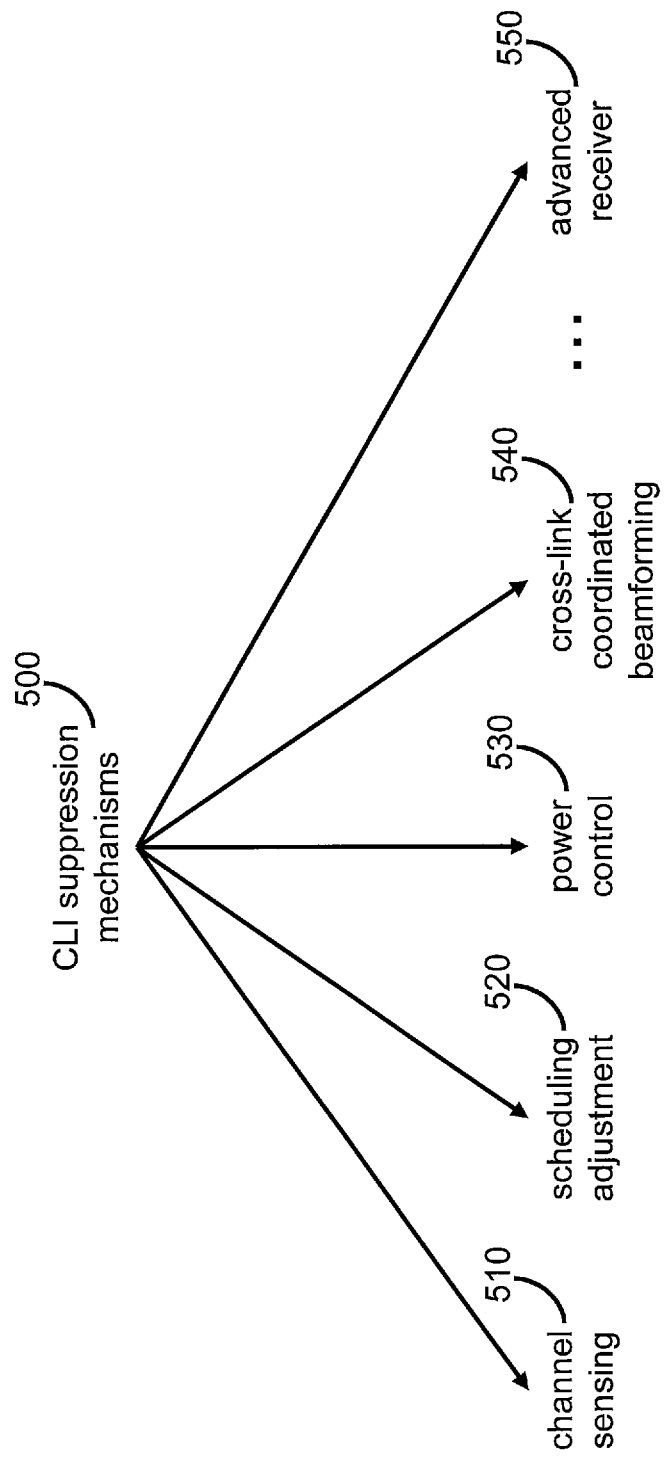
FIG. 5 illustrates exemplary CLI suppression mechanisms for suppressing or cancelling the CLI, in accordance with some embodiments of the present disclosure.

FIG. 5 illustrates exemplary CLI suppression mechanisms 500 for suppressing or cancelling the CLI, in accordance with some embodiments of the present disclosure. As shown in FIG. 5, exemplary CLI suppression mechanisms 500 include: a channel sensing scheme 510, a scheduling adjustment scheme 520, a power control scheme 530, a cross-link coordinated beamforming (CL-CBF) scheme 540, and an advanced receiver 550 for interference suppression or cancellation.

For channel sensing scheme 510, some blank resource of the frame structure should be specified to perform sensing operation before data transmission. An energy detection threshold for identifying the CLI may need to be defined. The design of CLI measurement or sensing signals to identify the cross-link interference may be specified. In addition, some sensing based statistical (long-term) CLI measurements and instantaneous (short-term) CLI measurement methods may be considered and some channel sensing parameters may be introduced.

Coordinated scheduling or scheduling adjustment 520 is another method to mitigate cross-link interference, which can be based on the results of sensing or measurement. Two candidate methods for scheduling after interference sensing or measurement can be considered as below.

Method 1: if strong cross-link interference is detected, the data will not be transmitted on the scheduled slot and the grant of the data will be given up.

Method 2: if strong cross-link interference is detected, the scheduling of the data will be adjusted to mitigate cross-link interference and the scheduling adjustment or link adaptation can be as: Alt 1: Reducing transmit power; Alt 2: Adjusting MCS, TBS; Alt 3: Changing carrier or beam; and Alt 4: Transmitting the data on another PRB or slot/HARQ process.

Power control 530 can be regarded as one potential method to manage cross-link interference in duplexing flexibility and to fulfil the performance requirements. For example, the aggressor TRP may decrease DL transmit power to alleviate interference on the UL reception of victim TRP. A flexible power control scheme may be considered to reduce the interference between UE-to-UE and TRP-to-TRP, since duplexing flexibility in NR will face more changeable cross-link interference. The transmit power should match with the interference level. As such, a same parameter set for transmit power can be configured for a given interference level.

CL-CBF 540 can be utilized to relieve TRP-to-TRP interference and UE-to-UE interference especially in high frequency. The TRP or UE can use beamforming or precoding to suppress the cross-link interference from/to adjacent TRPs or UEs. For example, the beam of the uplink transmission in the UE should avoid directing to an adjacent UE which is receiving the downlink transmission at the same time and vice versa.

Advanced receivers 550 may also be used for CLI suppression when victim signal and aggressive signal are superimposed. In an advanced receiver, such channel estimation algorithm as minimum mean square error interference rejection combining (LMMSE-IRC), maximum likelihood (ML), and iterative ML/R-ML can reduce the CLI of duplexing flexibility to some extent. The performance depends on the receive channel estimation algorithm. The timing alignment between DL and UL as well as the type of receivers may be designed to suppress the interference effectively.

Referring back to FIG. 2, the power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the event detector 220. Conversely, each of the modules illustrated in FIG. 2 can be implemented using a plurality of separate components or elements.

Figure 6:
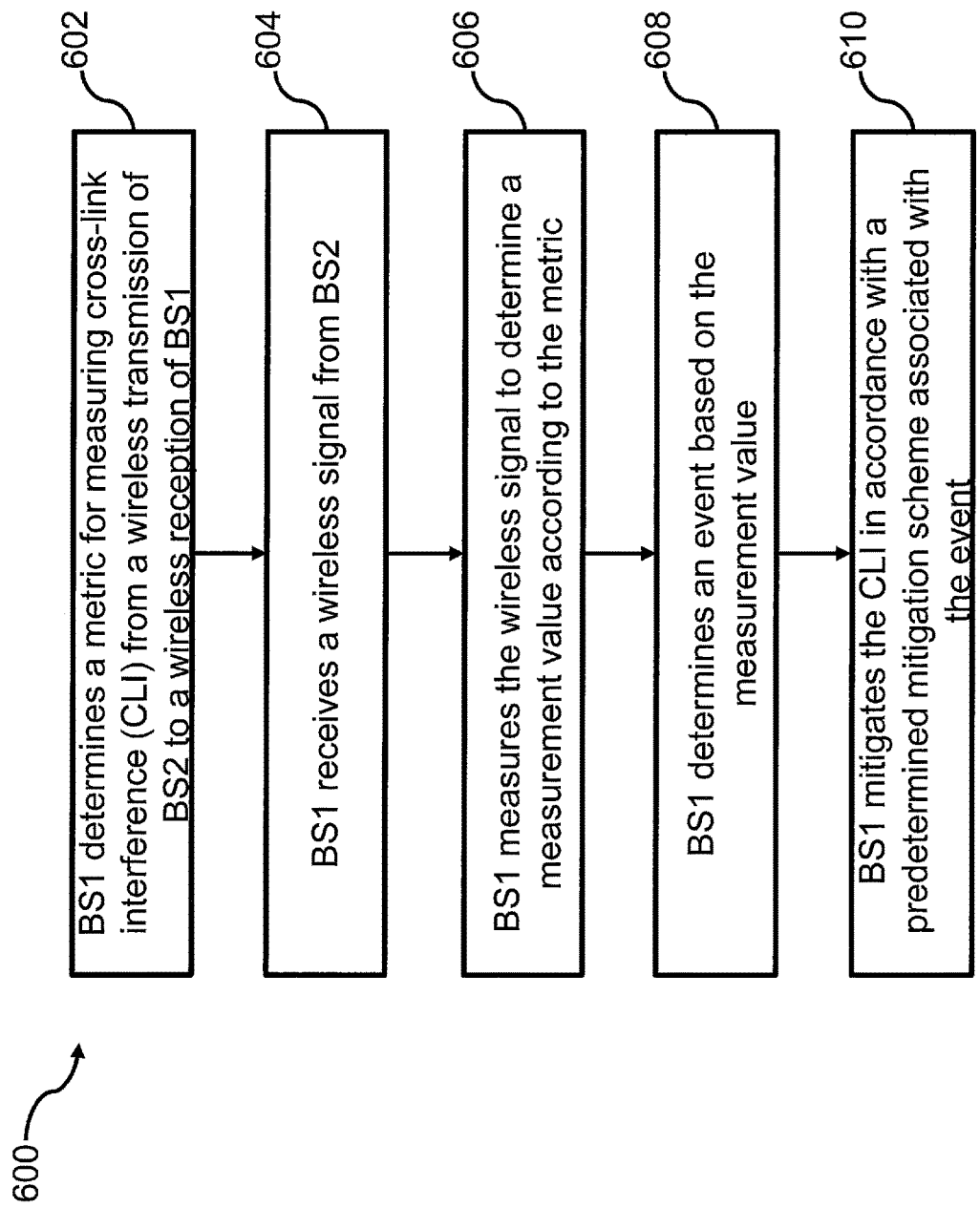
FIG. 6 illustrates a flow chart for a method performed by a first BS for mitigating the CLI from a second BS to the first BS, in accordance with some embodiments of the present disclosure.

FIG. 6 illustrates a flow chart for a method 600 performed by a first BS (BS1) for mitigating the CLI from a second BS (BS2) to the first BS (BS1), in accordance with some embodiments of the present disclosure. In one embodiment, each of the BS1 and BS2 may have a structure as shown in FIG. 2. At 602, BS1 determines a metric for measuring CLI from a wireless downlink transmission of BS2 to a wireless uplink reception of BS1. At 604, BS1 receives a wireless signal from BS2. The wireless signal may be downlink measurement signal sent by the BS2. At 606, BS1 measures the wireless signal to determine a measurement value according to the metric. As discussed above, the BS1 may measure the wireless signal on a measurement resource based on some configuration information. Based on the measurement value, BS1 determines an event at 608, e.g. by comparing the measurement value with a determined threshold value. At 610, BSI mitigates the CLI in accordance with a predetermined mitigation scheme associated with the event.

Figure 7:
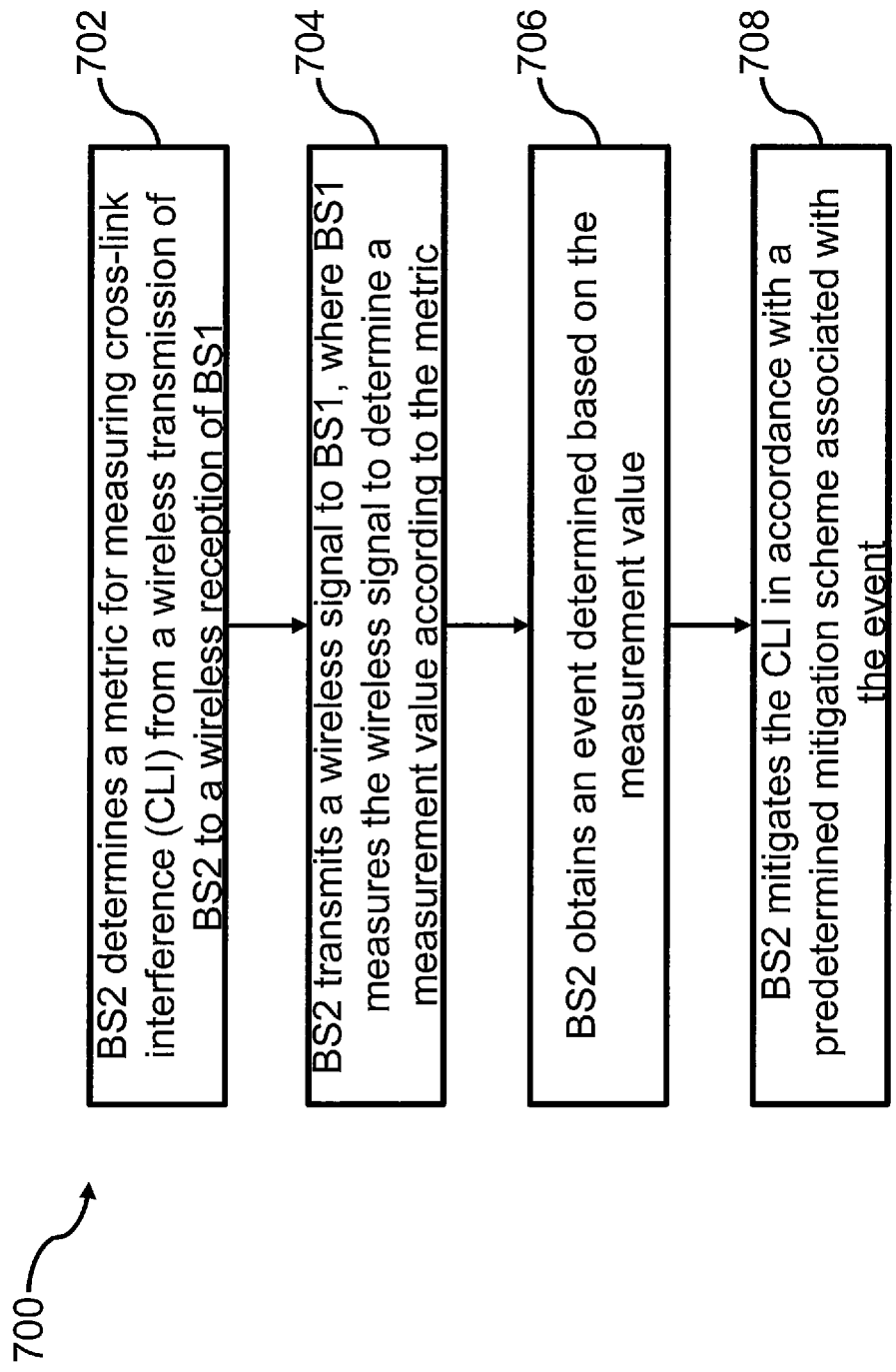
FIG. 7 illustrates a flow chart for a method performed by the second BS for mitigating the CLI from the second BS to the first BS, in accordance with some embodiments of the present disclosure.

FIG. 7 illustrates a flow chart for a method 700 performed by the second BS (BS2) for mitigating the CLI from the second BS (BS2) to the first BS (BS1), in accordance with some embodiments of the present disclosure. In one embodiment, each of the BS1 and BS2 may have a structure as shown in FIG. 2. At 702, BS2 determines a metric for measuring CLI from a wireless downlink transmission of BS2 to a wireless uplink reception of BS1. At 704, BS2 transmits a wireless signal to BS1, where BS1 measures the wireless signal to determine a measurement value according to the metric. The wireless signal may be downlink measurement signal sent by the BS2. At 706, BS2 obtains an event determined based on the measurement value. At 708, BS2 mitigates the CLI in accordance with a predetermined mitigation scheme associated with the event.

Different embodiments of the present disclosure will now be described in detail hereinafter. It is noted that the features of the embodiments and examples in the present disclosure may be combined with each other in any manner without conflict.

It can be understood that, the method applied to the TRP in the following embodiments can also be applied to another type of base station (eNB/gNB), an access point (AP), a cell, a small cell and other equipment deployed at the network side. The described method of CLI measurements between TRPs, between UEs, or between TRP and UE, can also be applied to beam-specific measurements between TRPs, between UEs, or between TRP and UE. For example, the disclosed method of measurements between TRPs is also applicable to a measurement between a transmission and receiving beam pair between TRPs based on beamforming; or the disclosed method of measurements between UEs is also applicable to a measurement between a transmission and receiving beam pair beam UEs based on beamforming.

In an embodiment for measuring CLI between TRP and TRP, one can use at least one of the following metrics about CLI measurements: CL-RSRP, CL-RSSI, and CL-RSRQ. While the conventional measurement metrics RSRP, RSSI, and RSRQ in LTE are measured by a UE, the above measurement metrics CL-RSRP, CL-RSSI, CL-RSRQ disclosed herein are measured by the TRP, which may be referred to as measurement TRP. To obtain a conventional RSRP or RSRQ, a base station sends a downlink reference signal such as CRS (Cell-specific reference signal), and a UE receives the downlink reference signal and performs the measurement. In contrast, to obtain the CL-RSRP or CL-RSRQ in accordance with some embodiments of the present disclosure, a TRP sends a measurement signal, and one or more other TRPs receive the measurement signal and perform the measurement of CLI.

As discussed above, the signals that can be used for the measurements of the above metrics include: CSI-RS, DMRS, SRS, and SSS.

CSI-RS in LTE is mainly used for downlink CSI measurements, sent by TRP, where UE receives and measures the signal. In this embodiment for measuring CLI between TRP and TRP, the CSI-RS can be sent by a TRP, where another TRP receives and performs the CLI measurements. Similar to LTE, the UE here may receive and measure the measurement signal. Because existing TRP already supports the transmission of CSI-RS, the TRP in this embodiment is enhanced to also have an ability to receive and measure CSI-RS.

DMRS may be called DMRS (UL) for the uplink demodulation reference signal; and may be called DMRS (DL) or UE-specific reference signals for the downlink demodulation reference signal. In LTE, DL DMRS is mainly used for downlink data demodulation, sent by TRP, where UE receives and performs channel estimation. In this embodiment for measuring CLI between TRP and TRP, DL DMRS can be sent by a TRP, where another TRP receives and performs CLI measurements. Further, the UE may also receive and measure the signal. The use of DMRS for measurements between TRPs can be symmetrically designed with the UL DMRS sent by the UE to avoid interference, and both signals can be sent or received at the same time. For example, DL DMRS and UL DMRS can be designed in orthogonality through FDM (frequency division multiplexing), TDM (time division multiplexing) or CDM (code division multiplexing).

SRS in LTE is mainly used for uplink CSI measurements, sent by the UE, where TRP receives and performs measurement. In this embodiment, the SRS can be sent by a TRP, where another TRP receives and performs the measurement. Further, the UE may also receive and measure the signal. The use of SRS for measurements between TRPs can be symmetrically designed with the UL SRS sent by the UE to avoid interference, and both signals can be sent or received at the same time.

For SSS, current 5G NR (New radio) has already supported SSS-based RRM (Radio Resource Management) measurement, where SSS is sent by the TRP, and UE receives and measures the signal. In this embodiment, the SSS is sent by a TRP, and another TRP receives and performs the measurement.

Based on the above-mentioned signals that can be used for measurements between TRP and TRP, the above measurement metrics in this embodiment can be described as follows. CL-RSRP in this embodiment is a measurement metric that can be used at TRP side (network side). CL-RSRP in this embodiment is a linear average of power of a resource element (RE) that carries the above mentioned measurement signal in the measurement band in a measurement resource. For example, CL-RSRP may use single-port measurements, such as port 15 based on CSI-RS, port 5/7/8 of DMRS. CL-RSRP can also use multi-port measurements, such as 2-port, or 4-port, or more (such as port 15-16 based on CSI-RS, or port 15-18, or port 15-22), if the single-port measurement accuracy is not satisfactory or the multi-port measurement accuracy is better.

A measurement resource may refer to one or more time slots in time domain, one or more sub-frames, one or more frames, one or more symbols, or one or more other time units. If the measurement TRP measures CLI according to CL-RSRP on a measurement resource, the measurement TRP can measure on each sub-frame, each time slot, or each symbol on the measurement resource. Alternatively, the measurement TRP may measure on each sub-frame, each slot, or each symbol that contains the measurement signal on the measurement resource.

A measurement resource can be configured in terms of cycle, duration, or offset. The measurement resource can be semi-statically configured, wherein one TRP can dynamically trigger another TRP to perform the measurement according to the measurement resource. For example, the measurement resources may be semi-statically configured as sub-frames 0 to 5, sub-frames 40 to 45, sub-frames 80 to 85, and so on. The measurement TRP does not have to perform measurements on all of these resources. Instead, when another TRP instructs the measurement TRP to perform measurements at sub-frames 40 to 45, the measurement TRP will measure in sub-frames 40 to 45. Measurement resources can also be configured and instructed in a non-periodic manner. The measured TRP can instruct the measurement TRP to measure, by the backhaul or OTA signaling.

The measurement resource may be obtained by a notification from an adjacent TRP, a coordination between two TRPs, or a pre-configuration (e.g., a standard protocol determination). An adjacent TRP may be a TRP that sends a measurement signal. Exemplary methods of notification or coordination include backhaul signaling and OTA (over the air) signaling.

The above measurement signal may refer to a measurement signal that is configured for CLI measurement between TRP and TRP. That is, the measurement signal for the CL-RSRP measurement is not specifically configured by the base station for the measurement by the UE, but for the measurement between TRP and TRP. Although the two may use the same type of reference signal, such as CSI-RS, the configurations or notifications of the two are different.

Alternatively, TRP configures part of the measurement resources used for LTE performing downlink measurements, as the measurement resources used for cross-link interference measurements, and informs the configured part of the measurement resources to the measurement TRP via backhaul or OTA signaling. That is, measurement resources used for cross-link interference measurements are subsets of measurement resources for UE downlink measurements.

For example, the CLI measurement resource/configuration is the same as the transmission configuration of CSI-RS or the configuration of CSI measurement configured for UE, or the CLI measurement resource/configuration is a subset of the transmission configuration of CSI-RS or the configuration of CSI measurement configured for UE. Some port(s), some sub-frames (slots), or some time/frequency resources in the transmission configuration of CSI-RS or in the configuration of CSI measurement configured for UE is/are used as the CLI measurement resource/configuration.

In one embodiment, the above-mentioned measurement resource may be obtained from a transmission configuration of measurement signals or a measurement configuration (i.e. a measurement pattern), which is informed by the neighbor TRPs. For example, a transmission or measurement configuration may refer to a resource, e.g., one or more time slots, one or more sub-frames, one or more frames, one or more symbols, or one or more other time units, in which a measurement signal is transmitted or a measurement pattern is configured.

In this embodiment, the measurement TRP is informed with the information of transmit power of the measurement signal by the neighbor TRP, e.g. by a notification based on backhaul signaling or OTA (over the air) signaling. The neighbor TRP transmits the measurement signal according to the transmission power setting. The measurement TRP can calculate the path loss between (a) the transmit power of the measurement signal sent by the neighbor TRP and (b) the CL-RSRP value measured by the TRP. CL-RSRP and path-loss between TRPs can be used to evaluate the interference level between TRPs. With a given transmit power of the measurement signal, the larger the CL-RSRP, the smaller the path-loss or fading between TRPs, which means a greater CLI if CLI occurs with cross-link communications, e.g. as shown in FIG. 1A and FIG. 1B. As such, one can assess the CLI level between TRPs by comparing a measured value of CL-RSRP or path-loss with one or more predetermined thresholds.

CL-RSSI in this embodiment is a measurement metric that can be used at TRP side (network side). The CL-RSSI in this embodiment is a linear average of the entire received power over the measurement band (bandwidth=N resource blocks) on certain symbols in the measurement resource, e.g. the measured sub-frames (or time slots), including both serving cell and non-serving cell co-channel interference, adjacent channel interference, thermal noise, and so on.

The CL-RSSI can be divided into three types. The first CL-RSSI-1 contains all the co-channel receive signal/interference, adjacent channel interference, and thermal noise, wherein the co-channel/adjacent channel interference in CL-RSSI-1 includes both same-link interference and cross-link interference. That is, there is no distinction between different link directions. The second CL-RSSI-2 contains co-channel receive signal/interference, adjacent channel interference, and thermal noise, wherein the co-channel/adjacent channel interference in CL-RSSI-2 includes only the cross-link interference (or mainly for cross-link interference). The third CL-RSSI-3 contains co-channel receive signal/interference, adjacent channel interference and thermal noise, wherein the co-channel/adjacent channel interference in CL-RSSI includes only the same-link interference (or mainly for the same-link interference), and wherein the CL-RSSI-3 can include signal or interference transmitted from neighbor TRPs as well as UEs.

There are several methods to measure CL-RSSI in the measurement sub-frame on certain symbols.

Method 1: The CL-RSSI is measured only on OFDM (Orthogonal Frequency Division Multiplexing) symbols that contain the measurement signal in the measurement resource (sub-frame or slot).

Method 2: The CL-RSSI is measured only on OFDM symbols that do not contain a measurement signal in the measurement resource (sub-frame or slot).

Method 3: The CL-RSSI is measured on all OFDM symbols in the measurement resource (sub-frame or slot). Here, all OFDM symbols may be all OFDM symbols in the uplink or downlink portion in the measurement resource (sub-frame or slot).

Method 4: The CL-RSSI is measured on all OFDM symbols in all sub-frames/time-slots on a particular resource. A particular resource refers to one or more time slots in time domain, one or more sub-frames, one or more frames, one or more symbols, or one or more other time units. Here, all OFDM symbols may be all OFDM symbols in the uplink or downlink portion in the measurement resource (sub-frame or slot).

CL-RSRQ in this embodiment is a measurement metric that can be used at TRP side (network side). CL-RSRQ may be defined as N*CL-RSRP/CL-RSSI, where N is the number of resource blocks (RBs) corresponding to the CL-RSSI measurement bandwidth. Because CL-RSSI has three types, there are three types of CL-RSRQ correspondingly.

The neighbor TRP may inform the measurement TRP about a transmission configuration or a measurement configuration. The transmission configuration may specify resources for transmitting the measurement signal. The measurement configuration may indicate resources for measuring the measurement signal.

In a first embodiment, the neighbor TRP may only inform the measurement TRP about the transmission configuration. The measurement TRP can consider the transmission configuration as a measurement configuration, and receive the measurement signal and perform measurement according to the informed configuration, which is transmission configuration here. For example, TRP1 sends a transmission configuration to TRP2, e.g. by backhaul signaling or OTA signaling, where the transmission configuration is for transmitting a measurement signal CSI-RS that is used for measurement between TRPs. The TRP2 can determine the measurement configuration based on the transmission configuration, and performs appropriate measurements. That is, TRP1 does not need to send a separate measurement configuration to TRP2.

In a second embodiment, the neighbor TRP may only inform the measurement TRP about the measurement configuration. The measurement TRP can receive the measurement signal and perform measurement in the informed configuration, which is measurement configuration here. For example, TRP1 sends a measurement configuration to TRP2 for measurements between TRPs, e.g. by backhaul signaling or OTA signaling. The TRP2 determines, based on the measurement configuration, on which resources the TRP1 will send the measurement signal, and can perform corresponding measurements. In one example, the measurement configuration can be a subset of the transmission configuration. For example, the TRP1 informs the measurement TRP2 to perform measurement in sub-frames 0, 10, 20, 30 . . . , while the TRP1 can transmit the measurement signal in sub-frames 0, 5, 10, 15, 20, 25, 30 . . . . That is, TRP1 does not need to send a separate measurement configuration to TRP2.

In a third embodiment, the neighbor TRP may inform the measurement TRP about both the transmission configuration and the measurement configuration.

As discussed above, after the measurement TRP measures the CLI measurement signal according to one of the cross-link measurement metrics, the measurement TRP compares the measurement result with a threshold value to determine an event that may trigger CLI mitigation. For TRP CLI measurements, one can define at least one of the following measurement events to trigger the interference cancellation or coordination mechanism or trigger interactions of measurement results between TRPs.

CL-B1 event: an event when the measurement result of the cross-link measurement metric is greater than (or equal to) an absolute threshold. This event can be used to trigger execution of some CLI suppression mechanism, e.g. to cancel the cross-link transmission or perform the interference suppression mechanism.

CL-B2 event: an event when the measurement result of the cross-link measurement metric is less than (or equal to) the absolute threshold. This event can be used to trigger an ending of some CLI suppression mechanism. That is, there is no need to consider CLI suppression when this event happens.

CL-B3 event: an event when the measurement result of the cross-link measurement metric is greater than (or equal to) the sum of (a) the measured values of the measurement metric in an uplink communication of the serving cell covering the measurement TRP and (b) an offset value. This event can be used to trigger the CLI suppression mechanism to take effect, e.g. to cancel the cross-link transmission or perform the interference suppression mechanism. For example, CL-B3 event happens when CL-RSRP>(RSRP+OFFSET), where CL-RSRP is the RSRP of the measurement signal sent by an adjacent TRP and measured by the measurement TRP, and RSRP is measured by the measurement TRP based on an RSRP or similar measurement of an uplink measurement signal sent by a UE in the same cell as the measurement TRP. The OFFSET can be positive, negative or zero, where the specific value of OFFSET is related to powers of the measurement signal sent by the neighbor TRP and the local UE, and is also related to the performance requirement. In another example, CL-B3 event happens when CL-RSRQ>(RSRQ+OFFSET), where the meanings of the parameters are similar to the above case of CL-RSRP>(RSRP+OFFSET).

It can be understood that the CL-B3 event may also be defined as CL-RSRP>(RSRP*OFFSET). As the measured value of CL-RSRP indicates a CLI, and the measured value of RSRP represents an uplink signal power level the measurement TRP receives, the difference or ratio between CL-RSRP and uplink RSRP can reflect a signal-to-interference-plus-noise ratio (SINR). As such, CL-B3 event happens when the SINR at the measurement TRP is lower than a threshold.

CL-B4 event: an event when the measurement result of the cross-link measurement metric is less than (or equal to) the sum of (a) the measured values of the measurement metric in an uplink communication of the serving cell covering the measurement TRP and (b) an offset value. This event can be used to trigger an ending of some CLI suppression mechanism. That is, there is no need to consider the CLI suppression when CL-B4 event happens. For example, CL-B4 event happens when CL-RSRP<(RSRP+OFFSET), where the meanings of the parameters are same as those in CL-B3 event. It can be understood that the CL-B4 event may also be defined as CL-RSRP<(RSRP*OFFSET). As the measured value of CL-RSRP indicates a CLI, and the measured value of RSRP represents an uplink signal power level the measurement TRP receives, the difference or ratio between CL-RSRP and uplink RSRP can reflect a signal-to-interference-plus-noise ratio (SINR). As such, CL-B4 event happens when the SINR at the measurement TRP is higher than a threshold.

CL-B5 event: an event when the measurement value of the cross-link measurement metric is greater than (or equal to) the sum of (a) the measured value of a same-link interference suffered by the measurement TRP and (b) an offset value. This event can be used to trigger execution of some CLI suppression mechanism, e.g. to cancel the cross-link transmission or perform the interference suppression mechanism. For example, when TRP performs CL-RSSI measurements, CL-B5 event happens when CL-RSSI-2>CL-RSSI-3+OFFSET, where OFFSET can be positive, negative or zero, where the specific value of OFFSET is related to transmit powers of the measurement signals for CLI and same-link interference, and is also related to the performance requirement. It can be understood that the CL-B5 event may also be defined as CL-RSSI-2>CL-RSSI-3*OFFSET.

CL-B6 event: an event when the measurement value of the cross-link measurement metric is less than (or equal to) the sum of (a) the measured value of a same-link interference suffered by the measurement TRP and (b) an offset value. This event can be used to trigger an ending of some CLI suppression mechanism. That is, there is no need to consider the CLI suppression when CL-B6 event happens. For example, when TRP performs CL-RSSI measurements, CL-B6 event happens when CL-RSSI-2<CL-RSSI-3+OFFSET, where the meanings of the parameters are same as those in the CL-B5 event. It can be understood that the CL-B6 event may also be defined as CL-RSSI-2<CL-RSSI-3*OFFSET.

Figure 8:
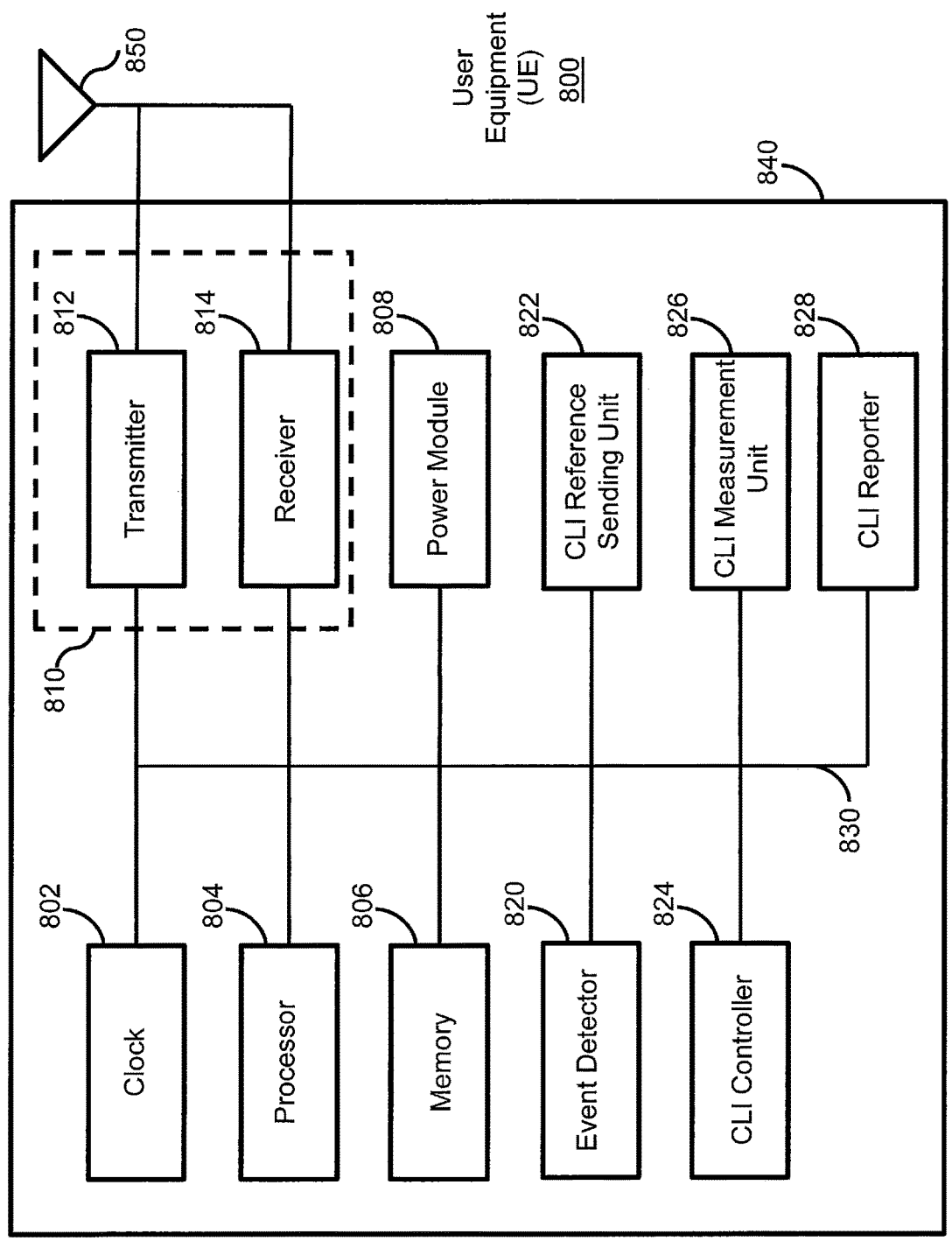
FIG. 8 illustrates a block diagram of a user equipment (UE), in accordance with some embodiments of the present disclosure.

FIG. 8 illustrates a block diagram of a user equipment (UE) 800, in accordance with some embodiments of the present disclosure. The UE 800 is an example of a device that can be configured to implement the various methods described herein. As shown in FIG. 8, the UE 800 includes a housing 840 containing a system clock 802, a processor 804, a memory 806, a transceiver 810 comprising a transmitter 812 and a receiver 814, a power module 808, an event detector 820, a CLI reference sending unit 822, a CLI controller 824, a CLI measurement unit 826, and a CLI reporter 828.

In this embodiment, the system clock 802, the processor 804, the memory 806, the transceiver 810 and the power module 808 work similarly to the system clock 202, the processor 204, the memory 206, the transceiver 210 and the power module 208 in the BS 200. An antenna 850 is typically attached to the housing 840 and electrically coupled to the transceiver 810.

The CLI reference sending unit 822 may send, via the transmitter 812, a wireless signal as a CLI measurement signal to another UE (e.g. a measurement UE in a neighbor cell) for measuring CLI from the UE 800 to the measurement UE. While a conventional reference signal is usually sent by a BS to a UE in the same cell as the BS for switching cells, the CLI measurement signal disclosed in this embodiment is sent by one UE to another UE for measuring CLI. For example, as shown in FIG. 1A, the UE2-1 122 may send a CLI measurement signal to the UE1-1 112 for measuring CLI from the UE2-1 122 to the UE1-1 112. In one embodiment, the CLI reference sending unit 822 may determine a transmit power and resources for transmitting the CLI measurement signal, based on a transmission configuration or measurement configuration notified by a BS in the same cell as the UE 800.

The CLI measurement unit 826 may measure a CLI measurement signal, e.g. sent by a neighbor UE in a neighbor cell, to determine a measurement value according to a predetermined metric for measuring CLI from the neighbor UE to the UE 800. While a conventional UE does not receive an uplink signal from another UE in a neighbor cell, the UE 800 disclosed herein can receive the CLI measurement signal as an uplink signal sent by a neighbor UE and then measure the measurement signal by the CLI measurement unit 826 according to a predetermined metric. For example, as shown in FIG. 1A, the UE1-1 112 may receive and measure a CLI measurement signal, which is an uplink signal sent by the UE2-1 122, to determine CLI from the UE2-1 122 to the UE1-1 112. In one embodiment, the receiver 814 may receive a notification of a measurement resource for measuring the CLI measurement signal from a local BS in the same cell as the UE 800, e.g. based on Radio Resource Control (RRC) signaling, Media Access Control (MAC) Control Element (CE), or Downlink Control Information (DCI) signaling. The CLI measurement unit 826 may then measure the signal on the measurement resource. In another embodiment, the receiver 814 may receive configuration information from the local BS. The configuration information may comprise: (a) a transmission configuration specifying resources for transmitting the measurement signal from the neighbor UE to the UE 800, (b) a measurement configuration about resources for measuring the measurement signal, or (c) both the transmission configuration and the measurement configuration. For example, the neighbor UE may transmit an uplink signal as the measurement signal in a first set of sub-frames including sub-frames 0, 5, 10, 15, 20, 25 . . . , while the CLI measurement unit 826 only measures the measurement signal in a second set of sub-frames including sub-frames 0, 10, 20, . . . that is a subset of the first set of sub-frames.

In one embodiment, the processor 804 may determine a measurement metric to be used for measuring the CLI. According to the determined metric, the CLI measurement unit 826 can measure the measurement signal to determine a measurement value, and send the measurement value to the event detector 820 for determining an event based on the measurement value.

The event detector 820 may receive the measurement value from the CLI measurement unit 826, compare the measurement value with a determined threshold value to generate a comparison result, and determine an event based on the comparison result. According to various embodiments, the determined threshold value may be determined based on: (a) an absolute threshold, (b) a reference measurement value of a first reference signal in a downlink communication received by the UE 800, and an offset related to powers of the measurement signal and the first reference signal, or (c) a reference measurement value of a second reference signal transmitted from the neighbor UE to the UE 800 when the two UE nodes perform wireless communications in a same link direction (both uplink or both downlink), and an offset related to powers of the measurement signal and the second reference signal. The event detector 820 determines which event happens, e.g. the measurement value of the measurement signal is greater than or less than a threshold value, and inform the CLI controller 824 about the event. In one embodiment, for an event detector in the UE1-1 112 in FIG. 1A, the event detector can determine whether the CLI 130 is greater than a determined threshold value or not, and inform a CLI controller in the UE1-1 112 for controlling the CLI 130. In another embodiment, for an event detector in the UE2-1 122 in FIG. 1A, the event detector can obtain an event about whether the CLI 130 is greater than a determined threshold value or not, and inform a CLI controller in the UE2-1 122 for controlling the CLI 130. This may happen when a CLI mitigation scheme asks the UE2-1 122 to adjust a transmit power or other transmit parameters.

In yet another embodiment, after detecting an event related to CLI, the event detector 820 may inform the CLI reporter 828, which will send a CLI report to the local BS in the same cell as the UE 800, such that the local BS can perform some CLI mitigation scheme in coordination with a neighbor BS covering the neighbor UE. While some CLI mitigation scheme can be performed by UE especially for UE-to-UE interference mitigation, many CLI mitigation schemes need to be performed or assisted by a BS, e.g. coordination scheduling, coordination beamforming, link adaptation, etc., which are schemes requiring some information exchange between TRPs.

The CLI controller 824 may receive the event information from the event detector 820, and mitigate the CLI in accordance with a predetermined mitigation scheme associated with the event. In one embodiment, the CLI controller 824 may dynamically control the CLI by: executing a CLI suppression mechanism when the event indicates that the measurement value is greater than or equal to the determined threshold value, and ending the CLI suppression mechanism when the measurement value is smaller than the determined threshold value. The determined threshold value may be dynamically adjusted based on a frequency of execution of the CLI suppression mechanism, or based on quality of service (QoS) requirement of the wireless communication in the network. In accordance with various embodiments, the CLI controller 824 may be in either the UE1-1 112 or the UE2-1 122 in FIG. 1A, for controlling the CLI 130.

The various modules discussed above are coupled together by a bus system 830. The bus system 830 can include a data bus and, for example, a power bus, a control signal bus, and/or a status signal bus in addition to the data bus. It is understood that the modules of the UE 800 can be operatively coupled to one another using any suitable techniques and mediums.

Although a number of separate modules or components are illustrated in FIG. 8, persons of ordinary skill in the art will understand that one or more of the modules can be combined or commonly implemented. For example, the processor 804 can implement not only the functionality described above with respect to the processor 804, but also implement the functionality described above with respect to the event detector 820. Conversely, each of the modules illustrated in FIG. 8 can be implemented using a plurality of separate components or elements.

Figure 9:
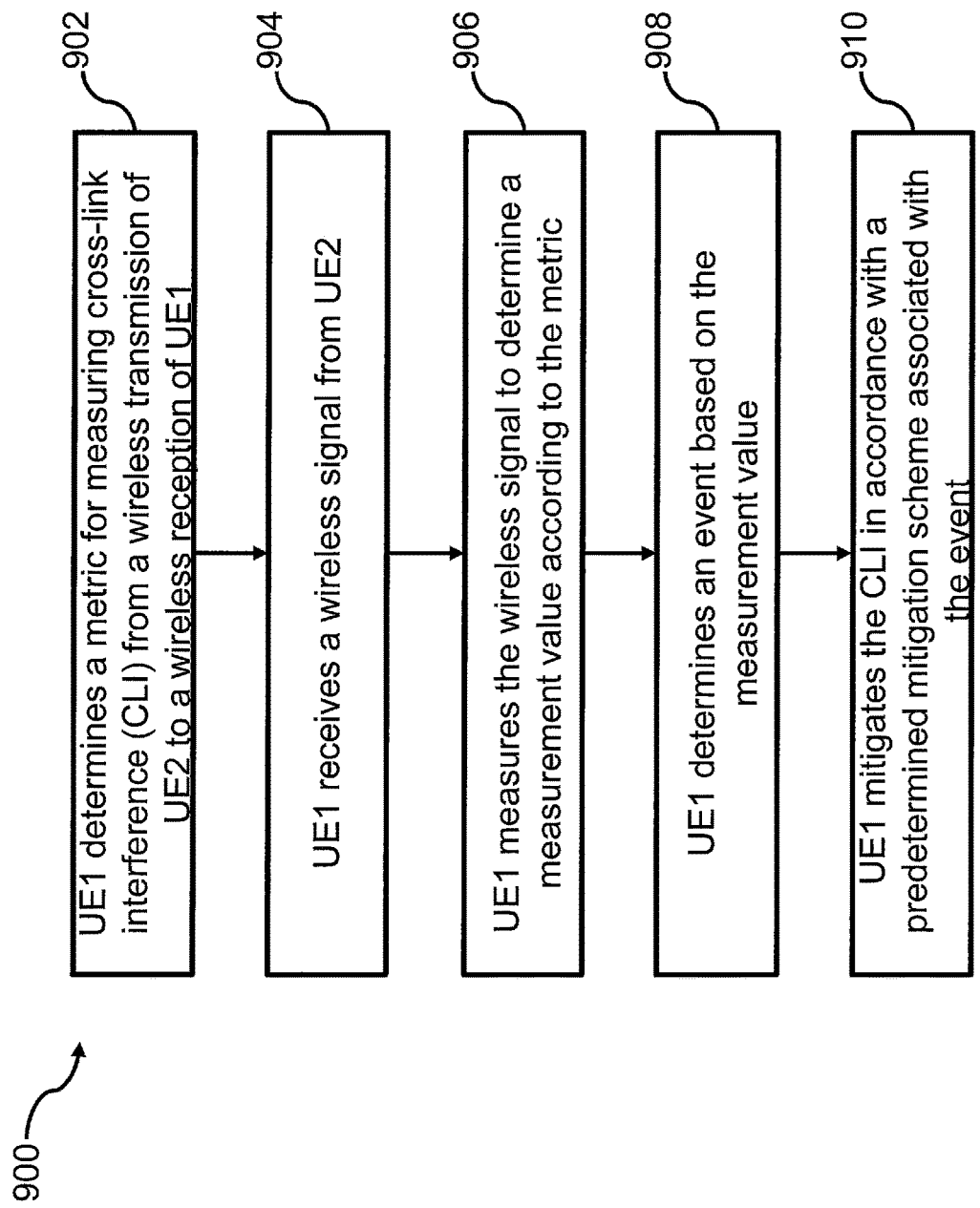
FIG. 9 illustrates a flow chart for a method performed by a first UE for mitigating the CLI from a second UE to the first UE, in accordance with some embodiments of the present disclosure.

FIG. 9 illustrates a flow chart for a method 900 performed by a first UE (UE1) for mitigating the CLI from a second UE (UE2) to the first UE (UE1), in accordance with some embodiments of the present disclosure. In one embodiment, each of the UE1 and UE2 may have a structure as shown in FIG. 8. At 902, UE1 determines a metric for measuring CLI from a wireless uplink transmission of UE2 to a wireless downlink reception of UE1. At 904, UE1 receives a wireless signal from UE2. The wireless signal may be an uplink measurement signal sent by the UE2. At 906, UE1 measures the wireless signal to determine a measurement value according to the metric. As discussed above, the UE1 may measure the wireless signal on a measurement resource based on some configuration information. Based on the measurement value, UE1 determines an event at 908, e.g. by comparing the measurement value with a determined threshold value. At 910, UE1 mitigates the CLI in accordance with a predetermined mitigation scheme associated with the event.

Figure 10:
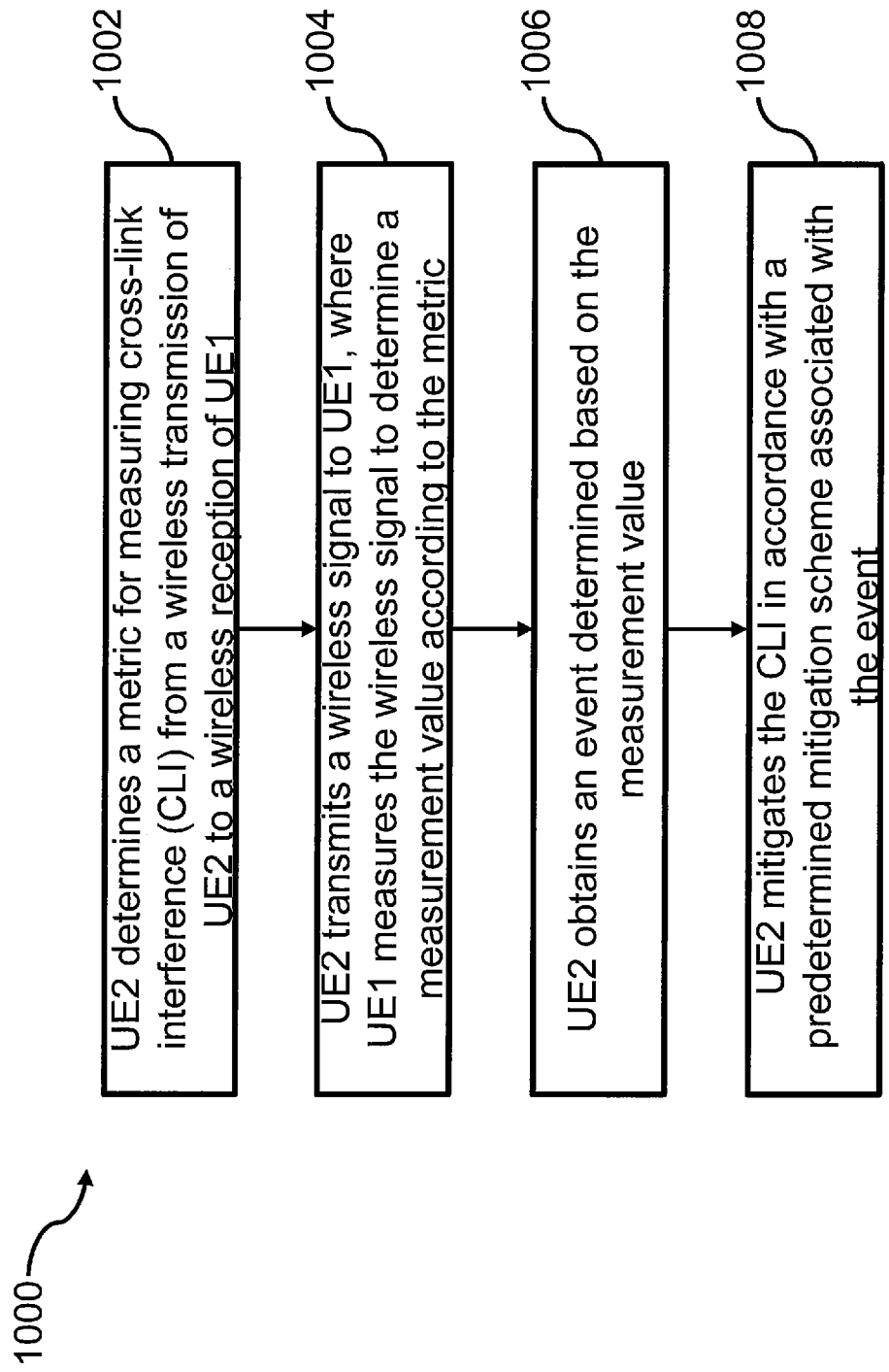
FIG. 10 illustrates a flow chart for a method performed by the second UE for mitigating the CLI from the second UE to the first UE, in accordance with some embodiments of the present disclosure.

FIG. 10 illustrates a flow chart for a method 1000 performed by the second UE (UE2) for mitigating the CLI from the second UE (UE2) to the first UE (UE1), in accordance with some embodiments of the present disclosure. In one embodiment, each of the UE1 and UE2 may have a structure as shown in FIG. 8. At 1002, UE2 determines a metric for measuring CLI from a wireless uplink transmission of UE2 to a wireless downlink reception of UE1. At 1004, UE2 transmits a wireless signal to UE1, where UE1 measures the wireless signal to determine a measurement value according to the metric. The wireless signal may be an uplink measurement signal sent by the UE2. At 1006, UE2 obtains an event determined based on the measurement value. At 1008, UE2 mitigates the CLI in accordance with a predetermined mitigation scheme associated with the event.

There are differences between TRP-to-TRP CLI and UE-to-UE CLI. The CLI level and channel state between neighbor gNB/TRPs (i.e. DL-to-UL interference) is relatively stable when cross-link transmission occurs since the position of gNB/TRP is fixed. In contrast, the CLI level and channel state between the UEs (i.e. UL-to-DL interference) is not as stable as the CLI between the gNBs/TRPs. The UE-to-UE CLI will be affected by the relative positions of UEs and UL power of the aggressor UE during the actual traffic transmission.

In an embodiment for measuring CLI between UE and UE, one can use at least one of the following metrics about CLI measurements: CL-RSRP, CL-RSSI, and CL-RSRQ. While the conventional measurement metrics RSRP, RSSI, and RSRQ in LTE are measured by a UE, the above measurement metrics CL-RSRP, CL-RSSI, CL-RSRQ disclosed herein are also measured by the UE, which may be referred to as measurement UE. To obtain a conventional RSRP or RSRQ, a base station sends a downlink reference signal such as CRS (Cell-specific reference signal), and a UE receives the downlink reference signal and performs the measurement. In contrast, to obtain the CL-RSRP or CL-RSRQ in accordance with some embodiments of the present disclosure, a UE sends a measurement signal, and one or more other UEs receive the measurement signal and perform the measurement of CLI.

The signals that can be used for the measurements of the above metrics for UE-to-UE CLI include: CSI-RS, DMRS, and SRS.

CSI-RS in LTE is mainly used for downlink CSI measurements, sent by UE, where UE receives and measures the signal. In this embodiment for measuring CLI between UE and UE, the CSI-RS can be sent by a UE, where another UE receives and performs the CLI measurements. Furthermore, the local TRP in this embodiment may also receive and measure the measurement signal. Because existing UE already supports the reception and measurement of CSI-RS, the UE in this embodiment is enhanced to also have an ability to transmit CSI-RS. The use of CSI-RS for measurements between UEs can be symmetrically designed with the DL CSI-RS sent by the TRP to avoid interference, and both signals can be sent or received at the same time.

DMRS may be called DMRS (UL) for the uplink demodulation reference signal; and may be called DMRS (DL) or UE-specific reference signals for the downlink demodulation reference signal. In LTE, UL DMRS is mainly used for uplink data demodulation, sent by UE, where TRP receives and performs channel estimation. In this embodiment for measuring CLI between UE and UE, UL DMRS can be sent by a UE, where another UE receives and performs CLI measurements. Further, the TRP may also receive and measure the signal. The use of DMRS for measurements between UEs can be symmetrically designed with the DL DMRS sent by the TRP to avoid interference, and both signals can be sent or received at the same time.

SRS in LTE is mainly used for uplink CSI measurements, sent by the UE, where TRP receives and performs measurement. In this embodiment, the SRS can be sent by a UE, where another UE receives and performs the measurement. Further, similar to LTE, the TRP may receive and measure the measurement signal. The use of SRS is very simple for UE transmission, because existing UE already supports the transmission of SRS, and there is only need to enhance the UE in this embodiment to also have the ability to receive and measure SRS.

Based on the above-mentioned signals that can be used for measurements between UE and UE, the above measurement metrics in this embodiment can be described as below.

CL-RSRP in this embodiment is a measurement metric that can be used at UE side. CL-RSRP in this embodiment is a linear average of power of a resource element (RE) that carries the above mentioned measurement signal in the measurement band in a measurement resource. For example, CL-RSRP may use single-port measurements, such as port 15 based on CSI-RS, port 5/7/8 of DMRS. CL-RSRP can also use multi-port measurements, such as 2-port, or 4-port, or more (such as port 15-16 based on CSI-RS, or port 15-18, or port 15-22), if the single-port measurement accuracy is not satisfactory or the multi-port measurement accuracy is better.

The measurement resource or measurement configuration can be configured in terms of cycle, duration, or offset. The measurement resource or measurement configuration can be configured semi-statically. For example, TRP can notify the UE about the measurement resource or measurement configuration by RRC signaling. Then the TRP can dynamically trigger the UE to perform the measurement. For example, the measurement resources may be semi-statically configured as sub-frames 0 to 5, sub-frames 40 to 45, sub-frames 80 to 85, and so on. But the measurement UE does not necessarily perform measurements on these resources. Instead, when the TRP instructs the measurement UE to perform measurements on the sub-frames 40 to 45 by the DCI or MAC CE, the measurement UE will measure at sub-frames 40 to 45 accordingly. Measurement resources can also be configured and instructed in a non-periodic manner. The measured TRP can instruct the measurement TRP to measure, by DCI or MAC CE.

The TRP may notify the measurement UE about the measurement resource, the measurement configuration, or the transmission configuration of a measurement signal sent from an adjacent UE, via RRC signaling, MAC (media access control) signaling, or DCI (downlink control information) signaling.

The measurement resource may refer to one or more time slots in time domain, one or more sub-frames, one or more frames, one or more symbols, or one or more other time units. If the measurement UE measures CLI according to CL-RSRP on a measurement resource, the measurement UE can measure on each sub-frame, each time slot, or each symbol on the measurement resource. Alternatively, the measurement UE may measure on each sub-frame, each slot, or each symbol that contains the measurement signal on the measurement resource.

The above-mentioned measurement resource, measurement configuration, or transmission configuration of a measurement signal from an adjacent UE, may be obtained by a notification from an adjacent TRP, a coordination between two TRPs, or a pre-configuration (e.g., a standard protocol determination), or preconfiguring and then dynamically triggering the measurement. The two TRPs include a first TRP in a cell to which the measurement UE belongs and a second TRP in a cell to which the neighbor UE (measured UE) belongs. Exemplary methods of coordination and notification between the two TRPs include backhaul signaling and OTA (over the air) signaling.

The above measurement signal may refer to a measurement signal that is configured for CLI measurement between UE and UE. That is, the measurement signal for the CL-RSRP measurement is not specifically configured by the base station for the UE to measure channel state between UE and TRP, but for the measurement between UE and UE. Although the two may use the same type of reference signal, such as SRS, the configurations or notifications of the two are different.

Alternatively, TRP configures part of the measurement resources used for TRP performing uplink measurements, as the measurement resources used for cross-link interference measurements; and the TRP serving for the measurement UE informs this configured part of the measurement resources to the measurement UE via RRC signaling, MAC CE or DCI. That is, measurement resources used for cross-link interference measurements are subsets of measurement resources for TRP uplink measurements.

For example, the CLI measurement resource/configuration is the same as the transmission configuration of SRS or the configuration of CSI measurement configured for TRP, or the CLI measurement resource/configuration is a subset of the transmission configuration of SRS or the configuration of CSI measurement configured for UE. Some port(s), some sub-frames (slots), or some time/frequency resources in the transmission configuration of SRS or in the configuration of CSI measurement configured for UE is/are used as the CLI measurement resource/configuration.

In one embodiment, the above-mentioned measurement resource may be obtained from a transmission configuration of measurement signals or a measurement configuration (i.e. a measurement pattern), which is informed by the local TRP. For example, a transmission or measurement configuration may refer to a resource, e.g., one or more time slots, one or more sub-frames, one or more frames, one or more symbols, or one or more other time units, in which a measurement signal is transmitted or a measurement pattern is configured.

The TRP can semi-statically configure the transmit power of the measurement signal for measuring CLI between UE and UE. While an existing uplink reference signal requires a dynamic power control, the transmit power of the measurement signal for measuring UE-to-UE CLI can be configured statically instead of dynamically. The TRP notifies the measurement UE of the transmit power of the measurement signal by the RRC signaling, the MAC CE or the DCI, where RRC signaling may be preferred. In one embodiment, the TRP informs the neighbor TRPs about the transmit power of the measurement signal used for UE-to-UE CLI measurement. Further, the neighbor TRPs configure the same transmit power for all UEs for the measurement signal used for UE-to-UE CLI measurement. For example, TRP1 and TRP2 configure the same transmit power for the measurement signal used for UE-to-UE CLI measurement for all UEs serving the TRP1 and TRP2.

The measurement UE can calculate the path loss between (a) the power of the measurement signal sent by another UE and (b) the CL-RSRP value measured by the UE. The CL-RSRP and path-loss between UEs can be used to evaluate the interference level between UEs. With a given transmit power of the measurement signal, the larger the CL-RSRP, the smaller the path-loss or fading between UEs, which means a greater CLI if CLI occurs with cross-link communications, e.g. as shown in FIG. 1A and FIG. 1B.

CL-RSSI in this embodiment is a measurement metric that can be used at UE side. The CL-RSSI in this embodiment is a linear average of the entire received power over the measurement band (bandwidth=N resource blocks) on certain symbols in the measurement resource, e.g. the measured sub-frames (or time slots), including both serving cell and non-serving cell co-channel interference, adjacent channel interference, thermal noise, and so on.

The CL-RSSI can be divided into three types. The first CL-RSSI-1 contains all the co-channel receive signal/interference, adjacent channel interference, and thermal noise, wherein the co-channel/adjacent channel interference in CL-RSSI-1 includes both same-link interference and cross-link interference. That is, there is no distinction between different link directions. The second CL-RSSI-2 contains co-channel receive signal/interference, adjacent channel interference, and thermal noise, wherein the co-channel/adjacent channel interference in CL-RSSI-2 includes only the cross-link interference (or mainly for cross-link interference). The third CL-RSSI-3 contains co-channel receive signal/interference, adjacent channel interference and thermal noise, wherein the co-channel/adjacent channel interference in CL-RSSI includes only the same-link interference (or mainly for the same-link interference), and wherein the CL-RSSI-3 can include signal or interference transmitted from neighbor UEs as well as TRPs.

There are several methods to measure CL-RSSI in the measurement sub-frame on certain symbols.

Method 1: The CL-RSSI is measured only on OFDM symbols that contain the measurement signal in the measurement resource (sub-frame or slot).

Method 2: The CL-RSSI is measured only on OFDM symbols that do not contain a measurement signal in the measurement resource (sub-frame or slot).

Method 3: The CL-RSSI is measured on all OFDM symbols in the measurement resource (sub-frame or slot). For example, if the upper layer indicates that all OFDM symbols are used for CL-RSRQ/CL-RSSI measurements, the CL-RSSI is measured on all OFDM symbols in the measurement resource (sub-frame or slot). Otherwise, Method 1 is executed by default. Here, all OFDM symbols may mean all OFDM symbols in the uplink or downlink portion in the measurement resource (sub-frame or slot).

Method 4: The CL-RSSI is measured on all OFDM symbols in all sub-frames/time-slots on a particular resource. A particular resource refers to one or more time slots in time domain, one or more sub-frames, one or more frames, one or more symbols, or one or more other time units. For example, if the upper layer indicates that some sub-frames (or time slots) are used for CL-RSRQ/CL-RSSI measurements, the CL-RSSI is measured on all OFDM symbols on the indicated sub-frames (or time slots). Otherwise, Method 1 is executed by default. Here, all OFDM symbols may mean all OFDM symbols in the uplink or downlink portion in the measurement resource (sub-frame or slot).

CL-RSRQ in this embodiment is a measurement metric that can be used at UE side. CL-RSRQ may be defined as N*CL-RSRP/CL-RSSI, where N is the number of resource blocks (RBs) corresponding to the CL-RSSI measurement bandwidth. Because CL-RSSI has three types, there are three types of CL-RSRQ correspondingly.

The TRP may inform the measurement UE about a transmission configuration or a measurement configuration. The transmission configuration may specify resources for transmitting the measurement signal. The measurement configuration may indicate resources for measuring the measurement signal.

In a first embodiment, the TRP may only inform the measurement UE about the transmission configuration. The measurement UE can consider the transmission configuration as a measurement configuration, and receive the measurement signal and perform measurement according to the informed configuration, which is transmission configuration here. For example, TRP1 sends a transmission configuration to TRP2, e.g. by backhaul signaling or OTA signaling, where the transmission configuration is for transmitting a measurement signal SRS by a UE1 that is in the same cell as TRP1. The TRP2 then sends the transmission configuration to UE2 that is in the same cell as the TRP2. The TRP2 may send via RRC or DCI, or send the transmission configuration by RRC, and then trigger the measurement by DCI. UE2 can determine the measurement configuration based on the transmission configuration, and performs appropriate measurements. That is, TRP1 does not need to send a separate measurement configuration to TRP2.

In a second embodiment, the TRP may only inform the measurement UE about the measurement configuration. The measurement UE can receive the measurement signal and perform measurement in the informed configuration, which is measurement configuration here. For example, TRP1 sends a measurement configuration to TRP2 for measurements between UEs, e.g. by backhaul signaling or OTA signaling. The TRP2 then sends the measurement configuration to UE2 that is in the same cell as the TRP2. The TRP2 may send via RRC or DCI, or send the measurement configuration by RRC, and then trigger the measurement by DCI. UE2 can perform corresponding measurements based on the measurement configuration. That is, the TRP1 does not need to send a separate transmission configuration to the TRP2. UE1 that is in the same cell as the TRP1 may transmit the measurement signal according to the measurement configuration. Alternatively, UE1 may transmit the measurement signal according to a transmission configuration, wherein the measurement configuration is a subset of the transmission configuration. For example, the UE2 performs measurement in sub-frames 0, 10, 20, 30 . . . , while the UE1 can transmit the measurement signal in sub-frames 0, 5, 10, 15, 20, 25, 30 . . . . That is, the TRP1 does not need to send a separate transmission configuration to the TRP2 or UE2.

In a third embodiment, the TRP may inform the measurement UE about both the transmission configuration and the measurement configuration.

As discussed above, after the measurement UE measures the CLI measurement signal according to one of the cross-link measurement metrics, the measurement UE compares the measurement result with a threshold value to determine an event that may trigger CLI mitigation or trigger a report of the CLI to TRP. For UE-to-UE CLI measurements, one can define at least one of the following measurement events to trigger the interference cancellation or coordination mechanism or trigger reports of measurement results between UEs.

CL-U1 event: an event when the measurement result of the cross-link measurement metric is greater than (or equal to) an absolute threshold. This event can be used to trigger execution of some CLI suppression mechanism, e.g. to cancel the cross-link transmission or perform the interference suppression mechanism.

CL-U2 event: an event when the measurement result of the cross-link measurement metric is less than (or equal to) the absolute threshold. This event can be used to trigger an ending of some CLI suppression mechanism. That is, there is no need to consider CLI suppression when this event happens.

CL-U3 event: an event when the measurement result of the cross-link measurement metric is greater than (or equal to) the sum of (a) the measured values of the measurement metric in a downlink communication of the serving cell covering the measurement UE and (b) an offset value. This event can be used to trigger the CLI suppression mechanism to take effect, e.g. to cancel the cross-link transmission or perform the interference suppression mechanism. For example, CL-U3 event happens when CL-RSRP>(RSRP+OFFSET), where CL-RSRP is the RSRP of the measurement signal sent by an adjacent UE and measured by the measurement UE, and RSRP is measured by the measurement UE based on an RSRP or similar measurement of a downlink measurement signal sent in the same cell as the measurement UE. The OFFSET can be positive, negative or zero, where the specific value of OFFSET is related to powers of the measurement signal sent by the neighbor UE and in the local cell, and is also related to the performance requirement. In another example, CL-U3 event happens when CL-RSRQ>(RSRQ+OFFSET), where the meanings of the parameters are similar to the above case of CL-RSRP>(RSRP+OFFSET).

It can be understood that the CL-U3 event may also be defined as CL-RSRP>(RSRP*OFFSET). As the measured value of CL-RSRP indicates a CLI, and the measured value of RSRP represents a downlink signal power level the measurement UE receives, the difference or ratio between CL-RSRP and uplink RSRP can reflect a signal-to-interference-plus-noise ratio (SINR). As such, CL-U3 event happens when the SINR at the measurement UE is lower than a threshold.

CL-U4 event: an event when the measurement result of the cross-link measurement metric is less than (or equal to) the sum of (a) the measured values of the measurement metric in a downlink communication of the serving cell covering the measurement UE and (b) an offset value. This event can be used to trigger an ending of some CLI suppression mechanism. That is, there is no need to consider the CLI suppression when CL-U4 event happens. For example, CL-U4 event happens when CL-RSRP<(RSRP+OFFSET), where the meanings of the parameters are same as those in CL-U3 event. It can be understood that the CL-U4 event may also be defined as CL-RSRP<(RSRP*OFFSET). As the measured value of CL-RSRP indicates a CLI, and the measured value of RSRP represents a downlink signal power level the measurement UE receives, the difference or ratio between CL-RSRP and uplink RSRP can reflect a signal-to-interference-plus-noise ratio (SINR). As such, CL-U4 event happens when the SINR at the measurement UE is higher than a threshold.

CL-U5 event: an event when the measurement value of the cross-link measurement metric is greater than (or equal to) the sum of (a) the measured value of a same-link interference suffered by the measurement UE and (b) an offset value. This event can be used to trigger execution of some CLI suppression mechanism, e.g. to cancel the cross-link transmission or perform the interference suppression mechanism. For example, when UE performs CL-RSSI measurements, CL-U5 event happens when CL-RSSI-2>CL-RSSI-3+OFFSET, where OFFSET can be positive, negative or zero, where the specific value of OFFSET is related to transmit powers of the measurement signals for CLI and same-link interference, and is also related to the performance requirement. It can be understood that the CL-U5 event may also be defined as CL-RSSI-2>CL-RSSI-3*OFFSET.

CL-U6 event: an event when the measurement value of the cross-link measurement metric is less than (or equal to) the sum of (a) the measured value of a same-link interference suffered by the measurement UE and (b) an offset value. This event can be used to trigger an ending of some CLI suppression mechanism. That is, there is no need to consider the CLI suppression when CL-U6 event happens. For example, when UE performs CL-RSSI measurements, CL-U6 event happens when CL-RSSI-2<CL-RSSI-3+OFFSET, where the meanings of the parameters are same as those in the CL-U5 event. It can be understood that the CL-U6 event may also be defined as CL-RSSI-2<CL-RSSI-3*OFFSET.

To some extent, the same-link interference can be used as a baseline for whether the cross-link interference can be tolerated. For example, UE1 DL reception may suffer the same link interference from the neighbor cell TRP2. UE1 DL reception may also suffer the cross link interference from UE2 attached in TRP2. If the same-link interference can be tolerated but the cross-link interference cannot, UE1 may suggest TRP1 to change transmission direction. The OFFSET can be obtained by simulation or test, where the value of OFFSET may depend on whether the UL reception can be accepted (e.g. whether it can satisfy a lowest requirement of UL SINR).

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method implemented on a first UE (user equipment) for mitigating cross-link interference (CLI) between the first UE and a second UE, the method comprising:
   receiving a SRS (sounding reference signal) from the second UE;
   measuring the SRS to determine a measurement value according to a predetermined metric for measuring CLI,
   wherein the predetermined metric comprises: a cross-link-reference signal received power (CL-RSRP) that is a linear average of power of resource elements that carry the SRS in measurement band in a measurement resource,
   wherein the CL-RSRP is measured using one single SRS port;
   determining an event for triggering CLI measurement results reporting based on the measurement value,
   wherein the event is that the measurement value of CLI is greater than or equal to an threshold.

2. The method of claim 1, wherein the predetermined metric further comprises:
   a cross-link-received signal strength indicator (CL-RSSI) that is a linear average of entire received power over the measurement band on one or more symbols in the measurement resource.

3. The method of claim 2, wherein:
   the measurement resource refers to: one or more time slots in time domain, one or more sub-frames, one or more frames, one or more symbols, or one or more other time units; and
   the measurement value according to the CL-RSRP is determined based on one of:
      each sub-frame, each time slot, or each symbol of the measurement resource; and
      each sub-frame, each time slot, or each symbol that contains the wireless signal of the measurement resource.

4. The method of claim 2, wherein:
   the measurement resource refers to: one or more time slots in time domain, one or more sub-frames, one or more frames, one or more symbols, or one or more other time units; and
   the measurement value according to the CL-RSSI is determined based on one of:
      symbols that contain the wireless signal on the measurement resource;
      symbols that do not contain the wireless signal on the measurement resource; and
      all symbols on the measurement resource.

5. The method of claim 1, wherein:
   the CLI is an interference from the second UE to the first UE, when the first UE is receiving a downlink signal while the second UE is transmitting an uplink signal at the same time; and
   the method further comprises receiving, from a BS, a notification of a measurement resource for measuring the wireless signal based on at least one of: Radio Resource Control (RRC) signaling, Media Access Control (MAC) Control Element (CE), and Downlink Control Information (DCI) signaling.

6. The method of claim 5, further comprising receiving configuration information from the BS, wherein:
   the configuration information comprises one of:
      a transmission configuration specifying resources for transmitting the wireless signal from the second UE to the first UE, and
      a measurement configuration about resources for measuring the wireless signal;
   the wireless signal is transmitted by the second UE in a first set of sub-frames;
   the wireless signal is measured by the first UE in a second set of sub-frames according to the configuration information; and
   the second set of sub-frames is a subset of the first set of sub-frames.

7. The method of claim 1, wherein threshold is determined based on at least one of:
   an absolute threshold,
   a first reference measurement value of a first reference signal in a downlink communication received by the first UE, and a first offset related to powers of the wireless signal and the first reference signal, and
   a second reference measurement value of a second reference signal transmitted from the second UE to the first UE when the first and second UEs perform wireless communications in a same link direction, and a second offset related to powers of the wireless signal and the second reference signal.

8. The method of claim 7, further comprising:
   executing a CLI suppression mechanism when the measurement value is greater than or equal to the threshold, wherein the threshold is dynamically adjusted based on a frequency of execution of the CLI suppression mechanism; and ending the CLI suppression mechanism when the measurement value is smaller than the threshold, wherein the CLI suppression mechanism is determined based on at least one of:
   a channel sensing scheme,
   a scheduling adjustment scheme,
   a power control scheme,
   a cross-link coordinated beamforming scheme, and
   an advanced receiver for interference suppression or cancellation.

9. A first UE (user equipment) configured to mitigate cross-link interference (CLI) between the first UE and a second UE, comprising:
   a receiver configured to receive a SRS (sounding reference signal) from the second node; and
   a processor configured to
      measure the SRS to determine a measurement value according to a predetermined metric for measuring CLI, and
      determine an event for triggering CLI measurement results reporting based on the measurement value,
   wherein the event is that the measurement value of CLI is greater than or equal to an threshold,
   wherein the predetermined metric comprises: a cross-link-reference signal received power (CL-RSRP) that is a linear average of power of resource elements that carry the SRS in measurement band in a measurement resource,
   wherein the CL-RSRP is measured using one single SRS port.

10. The first UE of claim 9, wherein the predetermined metric further comprises:
   a cross-link-received signal strength indicator (CL-RSSI) that is a linear average of entire received power over the measurement band on one or more symbols in the measurement resource.

11. The first UE of claim 10, wherein:
   the measurement resource refers to: one or more time slots in time domain, one or more sub-frames, one or more frames, one or more symbols, or one or more other time units; and
   the measurement value according to the CL-RSRP is determined based on one of:
      each sub-frame, each time slot, or each symbol of the measurement resource; and
      each sub-frame, each time slot, or each symbol that contains the wireless signal of the measurement resource.

12. The first UE of claim 10, wherein:
   the measurement resource refers to: one or more time slots in time domain, one or more sub-frames, one or more frames, one or more symbols, or one or more other time units; and
   the measurement value according to the CL-RSSI is determined based on one of:
      symbols that contain the wireless signal on the measurement resource;
      symbols that do not contain the wireless signal on the measurement resource; and
      all symbols on the measurement resource.

13. The first UE of claim 9, wherein:
   the CLI is an interference from the second UE to the first UE, when the first UE is receiving a downlink signal while the second UE is transmitting an uplink signal at the same time; and
   the receiver is further configured to receive, from a BS, a notification of a measurement resource for measuring the wireless signal based on at least one of: Radio Resource Control (RRC) signaling, Media Access Control (MAC) Control Element (CE), and Downlink Control Information (DCI) signaling.

14. The first UE of claim 13, wherein:
   the receiver is further configured to receive configuration information from the BS;
   the configuration information comprises one of:
      a transmission configuration specifying resources for transmitting the wireless signal from the second UE to the first UE, and
      a measurement configuration about resources for measuring the wireless signal;
   the wireless signal is transmitted by the second UE in a first set of sub-frames;
   the wireless signal is measured by the first UE in a second set of sub-frames according to the configuration information; and
   the second set of sub-frames is a subset of the first set of sub-frames.

15. The first UE of claim 9, wherein the threshold is determined based on at least one of:
   an absolute threshold,
   a first reference measurement value of a first reference signal in a downlink communication received by the first UE, and a first offset related to powers of the wireless signal and the first reference signal, and
   a second reference measurement value of a second reference signal transmitted from the second UE to the first UE when the first and second UEs perform wireless communications in a same link direction, and a second offset related to powers of the wireless signal and the second reference signal.

16. The first UE of claim 15, further comprising a CLI controller configured to:
   execute a CLI suppression mechanism when the measurement value is greater than or equal to the threshold, wherein the threshold is dynamically adjusted based on a frequency of execution of the CLI suppression mechanism; and
   end the CLI suppression mechanism when the measurement value is smaller than the threshold, wherein the CLI suppression mechanism is determined based on at least one of:
      a channel sensing scheme,
      a scheduling adjustment scheme,
      a power control scheme,
      a cross-link coordinated beamforming scheme, and
      an advanced receiver for interference suppression or cancellation.

* * * * *